US008804650B2

(12) United States Patent
Horiuchi et al.

(10) Patent No.: US 8,804,650 B2
(45) Date of Patent: Aug. 12, 2014

(54) WIRELESS COMMUNICATION DEVICE AND WIRELESS COMMUNICATION METHOD

(75) Inventors: Ayako Horiuchi, Kanagawa (JP); Seigo Nakao, Kanagawa (JP); Akihiko Nishio, Kanagawa (JP); Daichi Imamura, Kanagawa (JP); Yasuaki Yuda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 73 days.

(21) Appl. No.: 13/635,991

(22) PCT Filed: Mar. 22, 2011

(86) PCT No.: PCT/JP2011/001681
§ 371 (c)(1),
(2), (4) Date: Sep. 19, 2012

(87) PCT Pub. No.: WO2011/121936
PCT Pub. Date: Oct. 6, 2011

(65) Prior Publication Data
US 2013/0028124 A1 Jan. 31, 2013

(30) Foreign Application Priority Data
Mar. 31, 2010 (JP) .................................. 2010-083010

(51) Int. Cl.
*H04W 74/04* (2009.01)
*H04L 1/18* (2006.01)
*H04W 84/04* (2009.01)
*H04W 72/12* (2009.01)

(52) U.S. Cl.
CPC ........... *H04L 1/1854* (2013.01); *H04W 84/047* (2013.01); *H04W 72/1268* (2013.01)
USPC ............................ 370/329; 370/345; 714/748

(58) Field of Classification Search
None
See application file for complete search history.

(56) References Cited

U.S. PATENT DOCUMENTS 8,289,895 B2 * 10/2012 Yu et al. .......................... 370/315
8,402,335 B2 * 3/2013 Doppler et al. ............... 714/749

(Continued)

FOREIGN PATENT DOCUMENTS

JP 2009-89187 A 4/2009
WO 2009/022402 A1 2/2009

OTHER PUBLICATIONS

R1-094484 "ACK/NACK repetition resolving Uplink ACK loss problem", LG Electronics Inc., TSG WG1 Meeting #59, Jeju, Korea, Nov. 9-13, 2009.
R1-094464 "Relay Link HARQ Operations", Research in Motion UK Limited, 3GPP TSG WG1 Meeting #59, Jeju, Korea, Nov. 9-13, 2009.

(Continued)

*Primary Examiner* — Alex Skripnikov
(74) *Attorney, Agent, or Firm* — Pearne & Gordon LLP

(57) ABSTRACT

A wireless communication device according to the invention includes a reception section that receives a downlink signal in a first subframe from another wireless communication device; an ACK/NACK generation section that generates ACK/NACK which indicates an error determination result of the received downlink signal; a determination section that determines, when an uplink signal directed to the other wireless communication device is not allocated in a second subframe, whether a different uplink signal is allocated in a third subframe subsequent to the first subframe by a predetermined number of subframes and previous to the second subframe; a multiplexing section that multiplexes the ACK/NACK to the different uplink signal in the third subframe when the determination section determines that the different uplink signal is allocated in the third subframe; and a transmission section that transmits the different uplink signal in which the ACK/NACK is multiplexed by the multiplexing section.

8 Claims, 16 Drawing Sheets

(56) References Cited

U.S. PATENT DOCUMENTS

2008/0080423 A1* 4/2008 Kolding et al. ............... 370/329
2010/0118787 A1   5/2010 Yano et al.
2010/0135273 A1* 6/2010 Kim ............................ 370/344
2010/0246512 A1  9/2010 Kawamura et al.

OTHER PUBLICATIONS

R1-090066, "Relaying for LTE-Advanced", Alcatel Shanghai Bell, Alcatel-Lucent, 3GPP TSG WG1 Meeting #55bis, Ljubljana, Slovenia, Jan. 12-16, 2009.
International Search Report for PCT/JP2011/001681 dated Jun. 7, 2011.

* cited by examiner

WIRELESS COMMUNICATION DEVICE AND WIRELESS COMMUNICATION METHOD

TECHNICAL FIELD

The present invention relates to a wireless communication device and a wireless communication method, and more particularly, to a wireless communication device and a wireless communication method capable of performing communication through a relay transmission technique.

BACKGROUND ART

In recent years, in cellular mobile communication systems, transmission of large volumes of data such as still image data and moving-image data as well as audio data has been generalized with accompanying the increase of multimedia information. Techniques for realizing a high-transmission rate using a high-frequency wireless band have been actively studied to realize the transmission of large volumes of data.

When the high-frequency wireless band is used, however, a high-transmission rate is expected over a short distance, but attenuation increases as the transmission distance increases. Accordingly, when a mobile communication system using a high-frequency wireless band is actually operated, a coverage area of a wireless communication base station apparatus (hereinafter, simply referred to as a base station) is reduced. Therefore, it is necessary to install more base stations. Since the installation cost of base stations is considerable, techniques are required to realize communication services using a high-frequency wireless band while reducing the number of base stations.

To meet this demand, a relay transmission technique for installing a wireless communication relay station apparatus 20 (hereinafter, simply referred to as a relay station) between a base station 10 and a wireless communication mobile station apparatus 30 (hereinafter, simply referred to as a mobile station) and performing communication between the base station 10 and the mobile station 30 via the relay station 20 has been studied to increase the coverage area of each base station, as in a wireless relay system shown in FIG. 13. When a relay technique is used, even a terminal that ma not directly communicate with the base station can perform communication via the relay station 20. Further, a wireless communication mobile station apparatus 31 is connected directly to the base station 10.

[Description of TD Relay]

In a TD relay (also referred to as a half duplex relay), transmission from the base station 10 to the relay station 20 and transmission from the relay station 20 to the mobile station 30 are performed in a time division manner. FIG. 14 illustrates the TD relay in a downlink (DL) and FIG. 15 illustrates the TD relay in an uplink (UL). In FIGS. 14 and 15, the vertical axis indicates a time domain.

In the downlink shown in FIG. 14, transmission from the relay station 20 to the mobile station 30 is performed with an access link in subframe #2 and communication from the base station 10 to the relay station 20 is performed with a backhaul link in subframe #3. Then, the transmission from the relay station 20 to the mobile station 30 is performed again in subframe #4. Likewise, in the uplink shown in FIG. 15, transmission from the mobile station 30 to the relay station 20 is performed with the access link in subframe #2 and communication from the relay station 20 to the base station 10 is performed with the backhaul link in subframe #3. Then, the communication from the mobile station 30 to the relay station 20 is performed again in subframe #4.

As shown in FIGS. 14 and 15, the transmission time of the relay station 20 and a reception time of the relay station 20 can be divided by dividing the communication of the backhaul link of the relay station 20 (Relay) and the communication of the access link of the relay station 20 (Relay) on the time domain. Accordingly, the relay station 20 can perform relaying without an influence of loop between a transmission antenna and a reception antenna.

In LTE, data (referred to as UL data) of an uplink (hereinafter, referred to as UL) is allocated with a control signal called a UL grant. In an FDD system, it is regulated that UL data is allocated after four subframes of the UL grant transmitted in the downlink (hereinafter, referred to as DL). That is, the UL grant does not have information describing when the UL data is allocated, but it is allocated after four subframes at all times.

In the FDD system for LTE, it is regulated that UL data is transmitted in a UL subframe, and then ACK/NACK for the UL data is also transmitted in a DL subframe subsequent by four subframes. Further, it is regulated that ACK/NACK for DL data is also transmitted in a UL subframe subsequent to DL data by four subframes.

In LTE, as described above, the UL data is transmitted in the UL subframe after four subframes of the UL grant and ACK/NACK for the UL data is transmitted in the DL subframe after four subframes of the UL data. That is, it is regulated that the UL data is transmitted at 8TTI (Transmission Time Interval). According to this regulation, since it is not necessary to give a notification of a subframe number, overhead can be reduced. Further, "TTI" refers to a unit indicating the interval of a transmission time. Here, a relation of "1TTI=1 subframe" is satisfied.

In LTE, it is regulated that when ACK/NACK for the UL data and the ACK/NACK for the DL data are transmitted using the same UL subframe, the ACK/NACK signal for the DL data is multiplexed to the UL data and is transmitted. This is because it is difficult to simultaneously transmit the ACK/NACK signal for the UL data and the ACK/NACK for the DL data by each carrier since a transmission type of the UL data of LTE is a single carrier.

[Position of Backhaul]

In the TD relay, the relay station 20 receives a control signal from the base station 10 using only a subframe set in backhaul. Thus, the relay station 20 determines a "candidate position of the backhaul subframe" in advance. It is considered that the "candidate position of the backhaul subframe" of the DL is determined by the base station 10 and is noticed to the relay station 20. Whether the "candidate position of the backhaul subframe" of the DL is used in practice in the communication of the backhaul is notified using a control signal destined for the relation station 20 and transmitted from the base station 10

According to the same rule as LTE, the "candidate position of the backhaul subframe" of the UL is regulated as a "subframe after four subframes of a DL subframe" in the FDD system. Therefore, the "backhaul subframe after four subframes of a DL subframe" can be regulated to a "subframe of a backhaul" of the UL. In the UL, whether the "subframe of a backhaul." of the UL is used in practice in the communication of the backhaul is notified using a UL grant destined for the relation station 20 and transmitted from the base station (see Non Patent Literature 2)

CITATION LIST

Non Patent Literature

Non Patent Literature 1: R1-094484 "ACK/NACK repetition resolving Uplink ACK loss problem"
Non Patent Literature 2: R1-094464 "Relay Link HARQ Operations"

SUMMARY OF INVENTION

Technical Problem

FIG. 16 is one example (1) of the TD relay when the LTE regulation is applied. In FIG. 10, the vertical axis direction represents a time domain and numbers #2 to #7 represent subframes. In FIG. 16, "1TTI" indicates "one subframe."

FIG. 16 shows a case in which an interval (4TTI) at which the base station 10 transmits the UL grant in the DL subframe and then the relay station 20 transmits the UL signal to the base station 10 is the same as an interval (4TTI) at which the relay station 20 transmits the UL grant in the DL subframe and then the mobile station 30 connected to the relay station 20 transmits the UL signal to the relay station 20 (see Non Patent Literature 1).

As shown in FIG. 16, the relay station 20 cannot use subframe #7 as a UL resource of the access link, even when no UL grant is present in subframe #3 of the backhaul from the base station 10 and the UL resource of the backhaul is not allocated. This is because the relay station 20 needs to transmit the UL grant to the mobile station 30 in subframe #3 before four subframes of subframe #7 in order for the mobile station 30 to transmit the UL signal in subframe #7, but a timing at which the relay station 20 receives the allocation of the backhaul UL in subframe #3 overlaps with a timing at which the relay station 20 transmits allocation of the access link UL to the mobile station 30 connected to the relay station 20. As a result, in subframe #3, the relay station 20 does not know that subframe #7 can be used in the access link of the UL. Accordingly, there is a problem in that the UL resource of the access link may not be efficiently used.

An object of the invention is to provide a wireless communication device capable of efficiently using resources and reducing the number of times transmission and reception are switched therebetween.

Solution to Problem

The present invention provides a wireless communication device, including: a reception section that is configured to receive a downlink signal in a first subframe from a first other wireless communication device; an ACK/NACK generation section that is configured to generate ACK/NACK which indicates an error determination result of the received downlink signal; a determination section that is configured, when an uplink signal for a second other wireless communication device is not allocated in a second subframe, to determine whether a different uplink signal is allocated in one or more third subframes, which are subframes subsequent to the first subframe by a determined number of subframes and previous to the second subframe; a multiplexing section that is configured to multiplex the ACK/NACK to the different uplink signal in the third subframe when the determination section determines that the different uplink signal is allocated in the third subframe; and a transmission section that is configured to transmit the different uplink signal multiplexed by the multiplexing section to the first other wireless communication device.

In the wireless communication device, the determination section determines whether the different uplink signal is allocated in a subframe which is closest to the first subframe among the one or more third subframes subsequent to the first subframe by the predetermined number of subframes and previous to the second subframe.

In the wireless communication device, the determined number of subframes corresponds to a process delay time in the wireless communication device.

The present invention also provides a wireless communication device, including: a reception section that is configured to receive a downlink signal in a first subframe from a first other wireless communication device; an ACK/NACK generation section that is configured to generate ACK/NACK which indicates an error determination result of the received downlink signal; a determination section that is configured, when an uplink signal for a second other wireless communication device is not allocated in a second subframe, to determine whether a different uplink signal or ACK/NACK for a different downlink signal is allocated in one or more fourth subframes, which are subframes subsequent to the second subframe and previous to a third subframe subsequent to the second subframe by a determined number of subframes; a multiplexing section that is configured to multiplex the ACK/NACK to the different uplink signal or the ACK/NACK for the different downlink signal in the fourth subframe when the determination section determines that the different uplink signal or the ACK/NACK for the different downlink signal is allocated in the fourth subframe; and a transmission section that is configured to transmit the different uplink signal or the ACK/NACK for the different downlink signal multiplexed by the multiplexing section to the first other wireless communication device.

The wireless communication device includes a control signal generation section that is configured to generate a control signal used to notify the second other wireless communication device of information on a subframe that is usable in an access link based on a determination result of the determination section.

In the wireless communication device, the determined number of subframes corresponds to a difference between a process delay time in the wireless communication device and a time from the second subframe to a fifth subframe in which ACK/NACK responsive for an uplink signal transmitted in the second subframe is transmitted.

The present invention also provides a wireless communication method including: receiving a downlink signal in a first subframe from a first other wireless communication device; generating ACK/NACK which indicates an error determination result of the received downlink signal; when an uplink signal for a second other wireless communication device is not allocated in a second subframe, determining whether a different uplink signal is allocated in a third subframe, which is subframe subsequent to the first subframe by a determined number of subframes and previous to the second subframe; multiplexing the ACK/NACK to the different uplink signal in the third subframe when it is determined that the different uplink signal is allocated in the third subframe; and transmitting the multiplexed different uplink signal to the first other wireless communication device.

The present invention also provides a wireless communication method, including: receiving a downlink signal in a first subframe from a first other wireless communication device; generating ACK/NACK which indicates an error determination result of the received downlink signal; when an uplink signal for a second other wireless communication device is not allocated in a second subframe, determining whether a different uplink signal or ACK/NACK for a different downlink signal is allocated in a fourth subframe, which is a subframe subsequent to the second subframe and previous to a third subframe subsequent to the second subframe by a determined number of subframes; multiplexing the ACK/NACK to the different uplink signal or the ACK/NACK for the different downlink signal in the fourth subframe, when determining that the different uplink signal or the ACK/NACK for the different downlink signal is allocated in the fourth subframe; and transmitting the multiplexed different uplink signal or the multiplexed ACK/NACK for the different downlink signal to the first other wireless communication device.

Advantageous Effects of invention

According to the wireless communication device and the wireless communication method in aspects of the present invention, it is possible to improve the usage efficiency of the resource and reduce the number of times transmission and reception are switched therebetween.

DESCRIPTION OF EMBODIMENTS

Hereinafter, embodiments of the invention will be described with reference to the drawings.

First Embodiment

Figure 1:
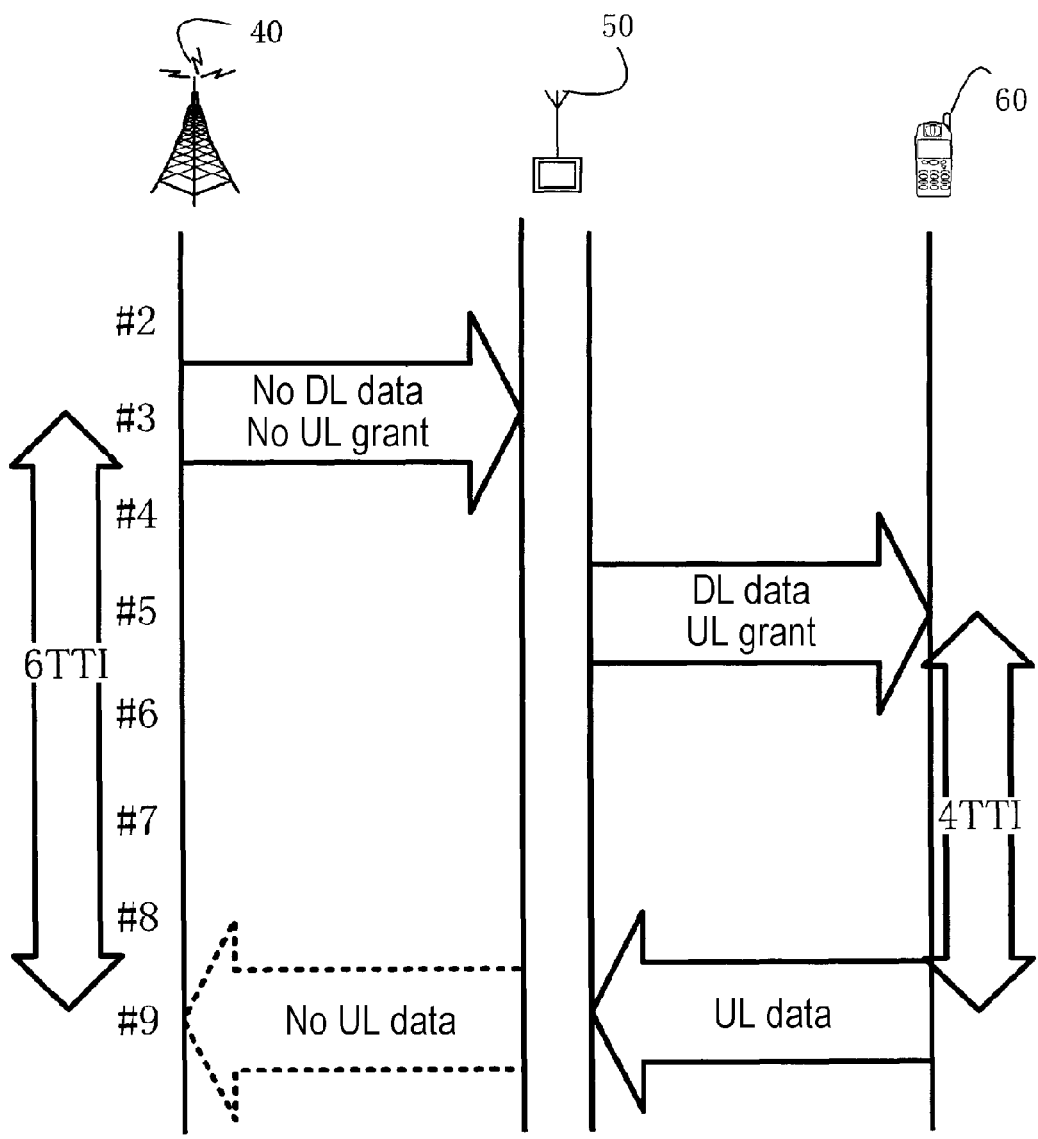
FIG. 1 illustrates an example (1) of TD relay.
Figure 14:
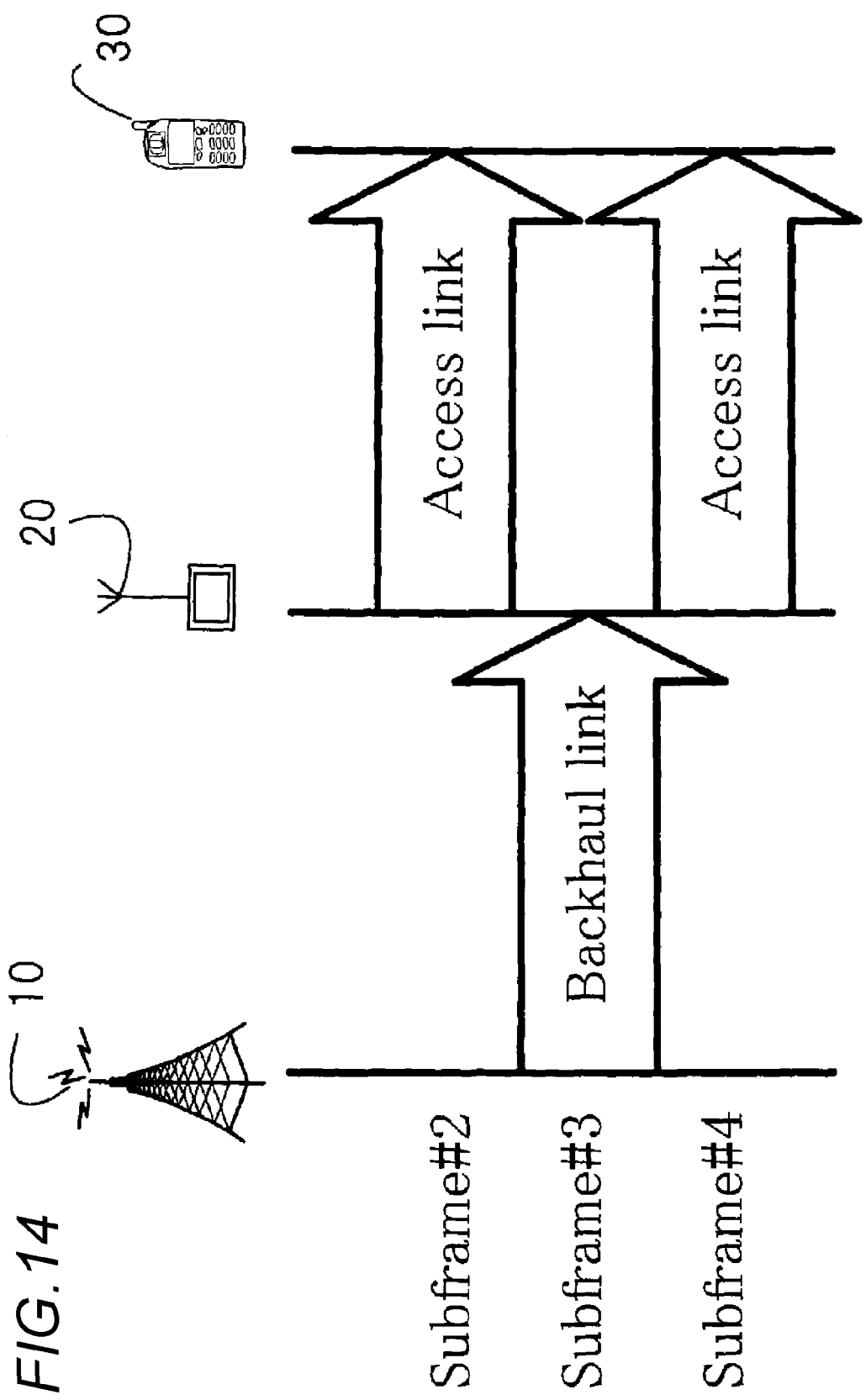
FIG. 14 illustrates TD relay in a downlink.
Figure 15:
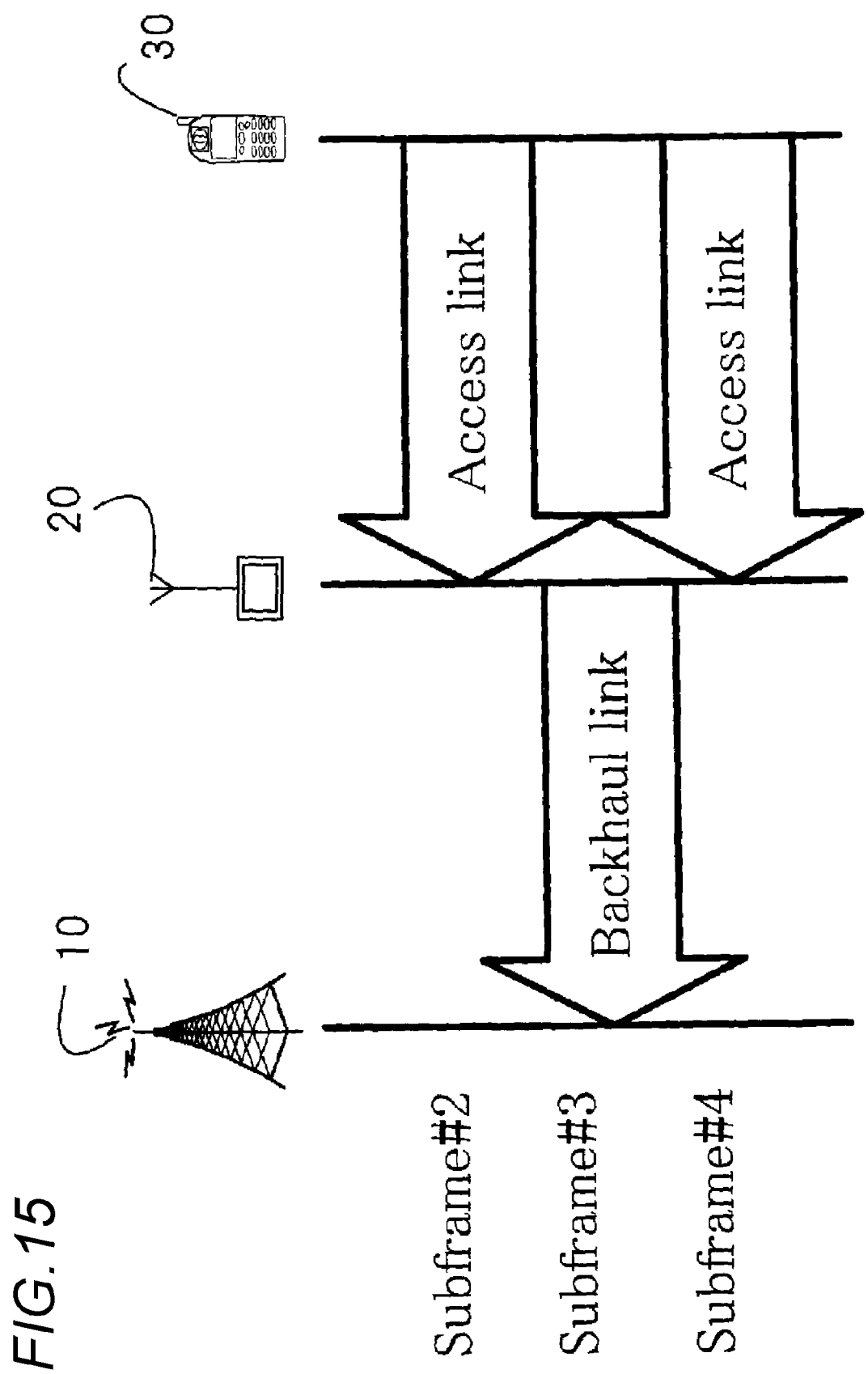
FIG. 15 illustrates TD relay in an uplink.
Figure 16:
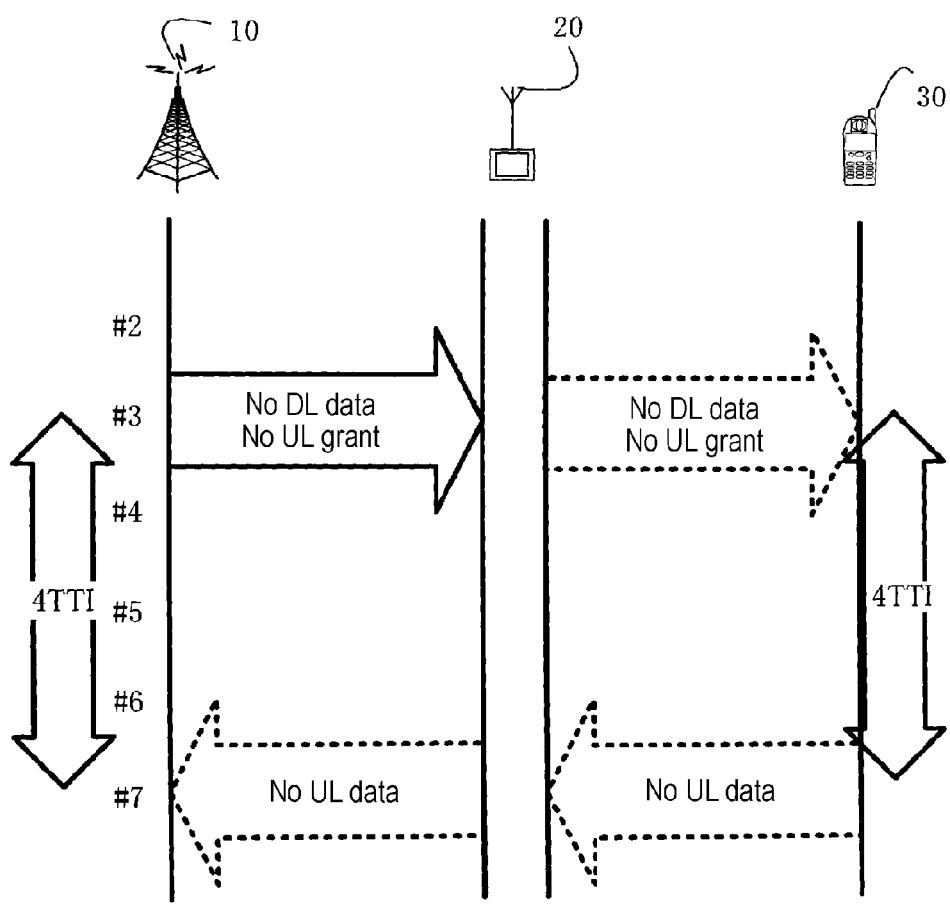
FIG. 16 illustrates one example (1) of the TD relay when LTE regulation is applied.

For example, the following methods can be considered to efficiently use the UL resource of the access link in the TD relay described with reference to FIGS. 14 and 15. FIG. 1 illustrates an example (1) of the TB relay. In FIG. 1, the vertical axis direction represents a time domain and numbers #2 to #9 represent subframes. In FIG. 1, "1TTI" indicates "one subframe."

As shown in FIG. 1, in a backhaul, a transmission time interval at which a relay station 50 receives a UL grant from the base station 40 and then the relay station 50 transmits UL data from a base station 40 and a transmission interval at which ACK/NACK of DL data from the DL data is transmitted is set to 5TTI or more (6TTI in FIG. 1). Thus, a time allowance appears between a timing (subframe #3 in FIG. 1) at which the relay station 50 receives allocation of a backhaul UL and a timing (subframe #5 in FIG. 1) at which the relay station 50 transmits allocation of an access link UL to a mobile station 60 connected to the relay station 50. Accordingly, the relay station 50 knows that UL allocation of the backhaul is not present in subframe #9 after 6TTI from subframe #3, when knowing whether to receive the UL grant from the base station 40 in subframe #3.

Thus, the relay station 50 determines whether to transmit a signal to the base station 40 in subframe #9 which is a backhaul subframe of the UL and can allocate an access link of the UL to the mobile station 60, which is connected to the relay station 50 in subframe #5 which is an access link subframe of the DL, in UL subframe #9 subsequent to subframe #5 by 4TTI. Accordingly, in the TD relay shown in FIG. 1, since an access link can be allocated to the mobile station 60 connected to the relay station 50, a usage efficiency of the resource of the UL access link can be improved.

Figure 2:
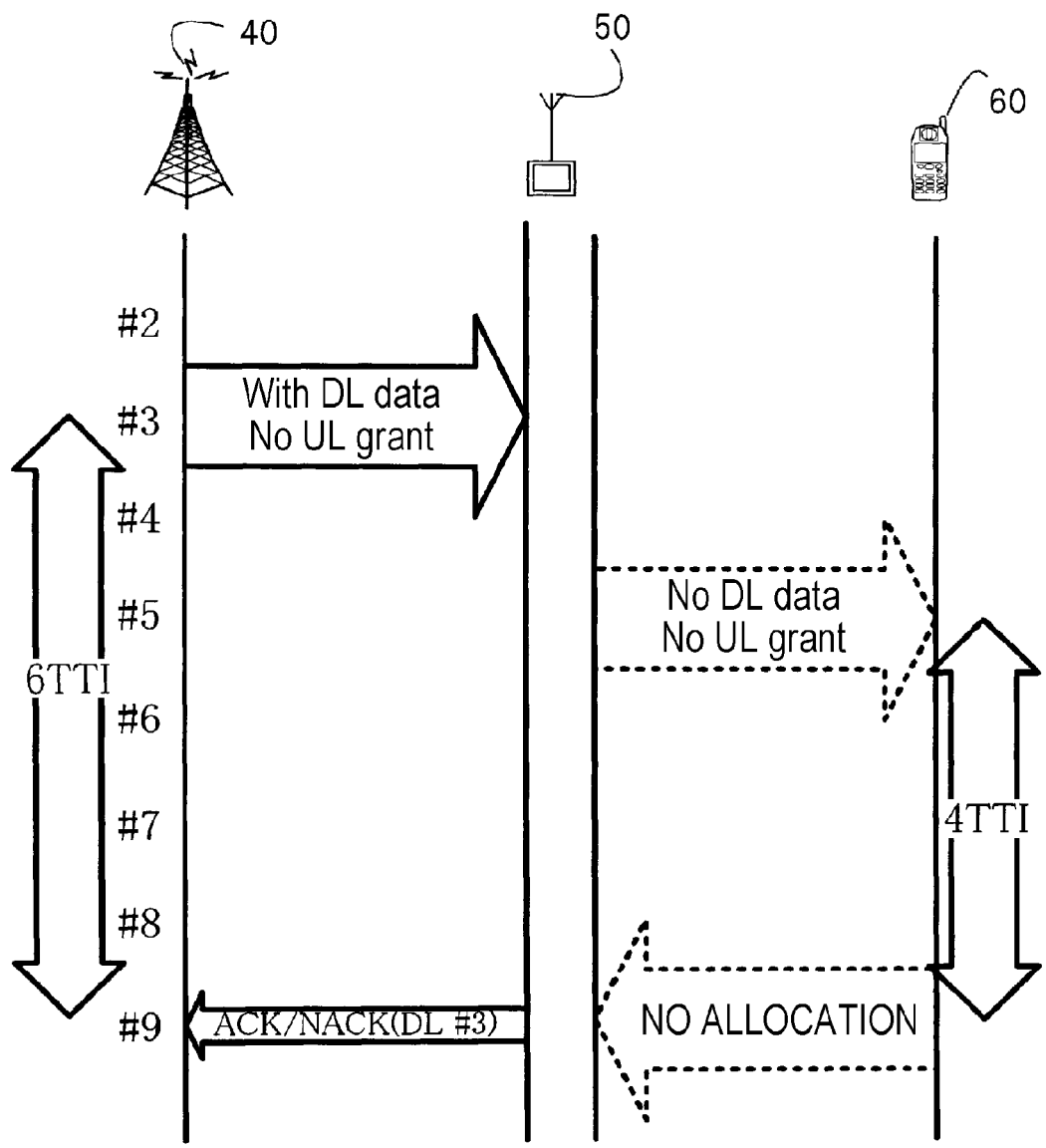
FIG. 2 illustrates an example (2) of the TD relay.

However, even when the UL data is not allocated in the backhaul but DL data is allocated in subframe #3, the relay station 50 needs to transmit ACK/NACK for the DL data to the base station 40 in subframe #9 subsequent to subframe #3 by six subframes. FIG. 2 illustrates an example (2) of the TD relay. In FIG. 2, the vertical axis direction represents a time domain and numbers #2 to #9 represent subframes. In FIG. 2, "1TTI" indicates "one subframe."

As shown in FIG. 2, since the relay station 50 transmits ACK/NACK for the DL data to the base station 40 in subframe #9, the relay station 50 cannot allocate the UL resource of the access link to the mobile station 60 connected to the relay station 50 in subframe #9. Since the amount of an ACK/NACK signal is the small number of bits, it is not desirable to use the entirety of subframe #9 in terms of the usage efficiency of the UL resource of the access link.

Accordingly, in the first embodiment, the relay station 100 multiplexes "ACK/NACK for DL data scheduled to be transmitted" to UL data of another subframe or ACK/NACK for another DL data in a subframe to which backhaul UL data is not allocated but DL data is allocated. Then, the relay station 100 transmits the multiplexed signal to the base station 200.

Candidates of the backhaul subframe of the UL for which the relay station 100 multiplexes "ACK/NACK for DL data scheduled to be transmitted" are subframes from a UL subframe after a process delay (for example, a time taken in erroneous determination and to generate an ACK/NACK signal) from a DL subframe, for which the DL data is allocated for the relay station 100 and no UL grant is present, to the subframe immediately previous to a "UL subframe in which ACK/NACK for the DL data is scheduled to be transmitted."

Figure 3:
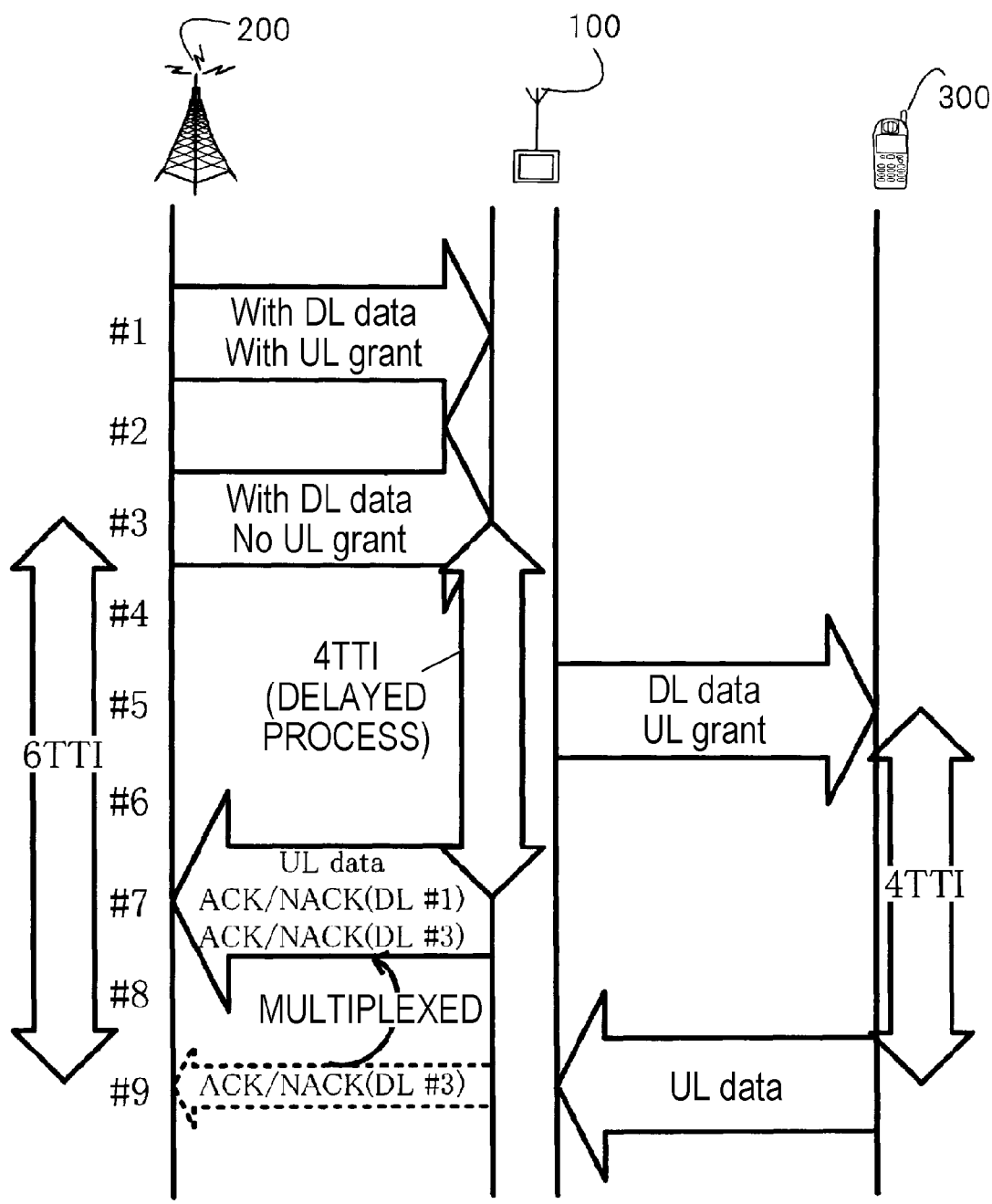
FIG. 3 illustrates an example of the TD relay according to a first embodiment.

FIG. 3 illustrates an example of the TD relay according to the first embodiment. In FIG. 3, the vertical axis direction represents a time domain and numbers #1 to #9 represent subframes. In FIG. 3, "1TTI" indicates "one subframe." Further, the time associated with the process delay of the relay station 100 is assumed to be four subframes. The subframe in which the DL data is allocated but no UL grant is present is assumed to be subframe #3. The UL subframe in which ACK/NACK for subframe #3 of the DL is scheduled to be transmitted is assumed to be subframe #9 subsequent to subframe #3 by 6TTI.

In FIG. 3, the candidates of the backhaul subframe of the UL for which the relay station 100 multiplexes "ACK/NACK for DL data scheduled to be transmitted" are subframes from subframe #7 subsequent to subframe #3 by four subframes (corresponding to a delay process) to subframe #8 immediately previous to subframe #9 in which ACK/NACK for subframe #3 of the DL is scheduled to be transmitted.

In the example of FIG. 3, since the relay station 100 transmits UL data (in the drawing. UL data) to the base station 200 using subframe #7, the relay station 100 multiplexes "ACK/NACK (in the drawing, ACK/NACK (DL #3) for the DL data of subframe #3" to the UL data (in the drawing UL data) and "ACK/NACK (in the drawing, ACK/NACK (DL #1) for the DL data of subframe #1" in subframe #7 and transmits the multiplexed result to the base station 200.

As described above, the relay station 100 according to this embodiment multiplexes ACK/NACK for the DL data to UL data in another UL subframe. Therefore, a subframe for which the relay station 100 may not transmit a signal to the base station 200 can be set in the subframes of the backhaul UL. Accordingly, in the access link UL, the relay station 100 can increase the number of subframes of the UL of the access link receivable from a mobile station 300 connected to the relay station 100.

The relay station 100 according to this embodiment has the advantage of reducing the number of times transmission and reception are switched therebetween. In the example of FIG. 3, the relay station 100 does not have to switch the transmission and reception in subframe #9. When the transmission and reception are switched therebetween, a switching period is necessary and symbols of the reception or transmission of the relay station 100 have to be sacrificed in the switching period. Accordingly, the relay station 100 can reduce the number of symbols which may not be used for the transmission and reception since the number of times the transmission and reception are switched therebetween is reduced.

Figure 4:
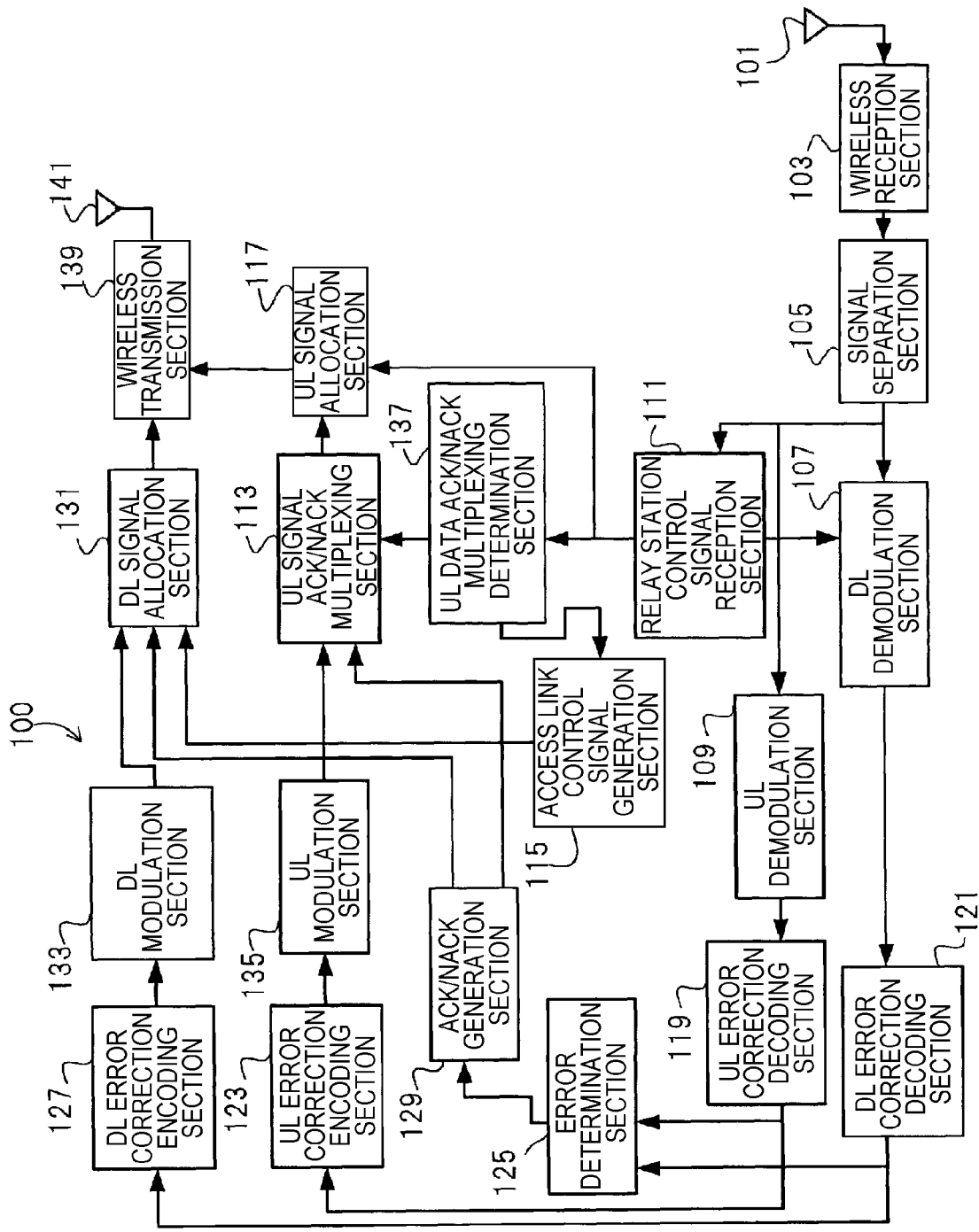
FIG. 4 is a block diagram illustrating the configuration of a relay station 100 according to the first embodiment.

The configuration of the relay station 100 according to this embodiment will be described with reference to FIG. 4 FIG. 4 is a block diagram illustrating the configuration of the relay station 100 according to this embodiment.

The relay station 100 shown in FIG. 4 includes a reception antenna 101, a wireless reception section 103, a signal separation section 105, a DL demodulation section 107, a UL demodulation section 109, a relay station control signal reception section 111, a UL data ACK/NACK multiplexing section 113, an access link control signal generation section 115, a UL signal allocation section 117, a UL error correction decoding section 119, a DL error correction decoding section 121, a UL error correction encoding section 123, an error determination section 125, a DL error correction encoding section 127, an ACK/NACK generation section 129, a DL signal allocation section 131, a DL modulation section 133, a UL modulation section 135, a UL data ACK/NACK multiplexing determination section 137, a wireless transmission section 139, and a transmission antenna 141.

The wireless reception section 103 receives a signal from the base station 200 through the reception antenna 101. The wireless reception section 103 performs wireless processing such as down-conversion on the received signal and outputs the processed signal to the signal separation section 105.

The signal separation section 105 separates the signal input from the wireless reception section 103 into a DL signal and a UL signal, and a control signal. The separated DL signal is output to the DL demodulation section 107. The separated UL signal is output to the UL demodulation section 109. The separated control signals are output to the relay station control signal reception section 111.

The relay station control signal reception section 111 demodulates and decodes a relay station control signal transmitted from the base station 200 among the control signals separated by the signal separation section 105. Further, a DL control signal and a UL control signal separated among the control signals by the signal separation section 105 are output to the UL data ACK/NACK multiplexing determination section 137. The UL control signal is also output to the UL signal allocation section 117.

The UL demodulation section 109 demodulates the UL signal input from the wireless reception section 103 and outputs the demodulated UL signal to the UL error correction decoding section 119.

The DL demodulation section 107 demodulates the DL signal input from the wireless reception section and outputs the demodulated DL signal to the DL error correction decoding section 121.

The UL error correction decoding section 119 decodes the signal input from the UL demodulation section 109 and outputs the decoded signal to the UL error correction encoding section 123 and the error determination section 125.

The DL error correction decoding section 121 decodes the signal input from the DL demodulation section 107 and outputs the decoded signal to the DL error correction encoding section 127 and the error determination section 125.

The error determination section 125 determines whether an error occurs in the input signal and outputs the determination result to the ACK/NACK generation section 129.

The ACK/NACK generation section 129 generates a NACK when it is determined that an error occurs. The ACK/NACK generation section 129 generates an ACK when it is determined that no error occurs. The ACK/NACK generation section 129 outputs the determination result of the DL signal to the DL signal allocation section 131. The ACK/NACK generation section 129 outputs the determination result of the UL signal to the UL data ACK/NACK multiplexing section 113.

The decoded DL signal output from the DL error correction decoding section 121 is processed by the DL error correction encoding section 127 and the DL modulation section 133, and then the processed signal is output to the DL signal allocation section 131.

The decoded UL signal output from the UL error correction decoding section 119 is processed by the UL error correction encoding section 123 and the UL modulation section 135, and then the processed signal is output to the UL data ACK/NACK multiplexing section 113.

Based on the UL control signal and the DL control signal, the UL data ACK/NACK multiplexing determination section 137 determines whether the UL signal and ACK/NACK are transmitted with the same subframe. When the UL data ACK/NACK multiplexing determination section 137 determines that the UL signal and the ACK/NACK signal are transmitted with the same subframe, the UL data ACK/NACK multiplexing determination section 137 determines that the ACK/NACK signal is multiplexed to the UL signal. Conversely, when the UT data ACK/NACK multiplexing determination section 137 determines that the UL signal and the ACK/NACK signal are transmitted with different subframes, the UL data ACK/NACK multiplexing determination section 137 determines that the ACK/NACK signal is not multiplexed to the UL signal.

Determination method (1) to (3) of the UL data ACK/NACK multiplexing determination section 137 will be described.

(1) When the UL data is allocated to subframe "#N+B1" subsequent to subframe #N in which the DL subframe is allocated by "B1" subframes, it is determined that ACK/NACK for the DL data is multiplexed to the UL data. Further, the UL data ACK/NACK multiplexing determination section 137 determines whether the UL data is allocated to subframe "#N+B1" subsequent to subframe #N, in which the DL subframe is allocated, by subframes "B1" by determining whether the UL grant is present in subframe #N" of the backhaul of the DL.

(2) When the UL data is not allocated to subframe "#NB+B1" and the UL data is allocated in a subframe from subframe "#N+D" to subframe "#N+B1−1", ACK/NACK scheduled to be transmitted with subframe "#N+B1" is multiplexed to the subframe to which the UL data is allocated. Here, the subframe to which a signal in which ACK/NACK is multiplexed to the UL data is allocated is one of the backhaul subframe of the UL from subframe "#N+D" to subframe "#N+B1−1."

(3) When the UL data is not allocated and ACK/NACK for the DL data is transmitted in a subframe from subframe "#N+D" to subframe "#N+B1−1", ACK/NACK scheduled to be transmitted with subframe "#N+B1" is multiplexed to a subframe in which ACK/NACK is scheduled to be transmitted. Here, the subframe in which ACK/NACK is scheduled to be transmitted is one of the backhaul subframes of the UL from subframe "#N+D" to subframe "#N+B1−1." Further, the determination result of the UL data ACK/NACK multiplexing determination section 137 is output to the UL data ACK/NACK multiplexing section 113 and the access link control signal generation section 115.

The UL data ACK/NACK multiplexing section 113 multiplexes the ACK/NACK signal to the UL data or the ACK/NACK signal based on the determination result input from the UL data ACK/NACK multiplexing determination section 137 and outputs the multiplexed UL signal to the UL signal allocation section 117. Further, when it is not necessary to multiplex the AC/KNACK signal to the UL data or the ACK/NACK signal, the UL data ACK/NACK multiplexing section 113 outputs the UL data or the ACK/NACK signal to the UL signal allocation section 117 without multiplexing the ACK/NACK signal.

The UL signal allocation section 117 allocates the 131, data in the UL signal to a resource designated by the UL control signal. Further, the UL signal allocation section 117 allocates the ACK/NACK signal not multiplexed to the UL data in the UL signal to a resource of the UL control signal and outputs the ACK/NACK signal to the wireless transmission section 139.

The access link control signal generation section 115 adds a subframe usable in the access link based on the determination result of the UL data ACK/NACK multiplexing determination section 137, generates a control signal to be transmitted to the mobile station 300, and outputs the control signal for the mobile station 300 to the DL signal allocation section 131.

The DL signal allocation section 131 allocates the DL signal, the ACK/NACK signal, and the control signal for the mobile station 300 to the resource of the access link and outputs the DL signal, the ACK/NACK signal, and the control signal for the mobile station 300 to the wireless transmission section 139.

The wireless transmission section 139 performs wireless processing such as up-conversion on the DL signal, the ACK/NACK signal, and the control signal for the mobile station 300 output from the DL signal allocation section 131 and transmits the processed results to the mobile station 300 through the transmission antenna 141.

Figure 5:
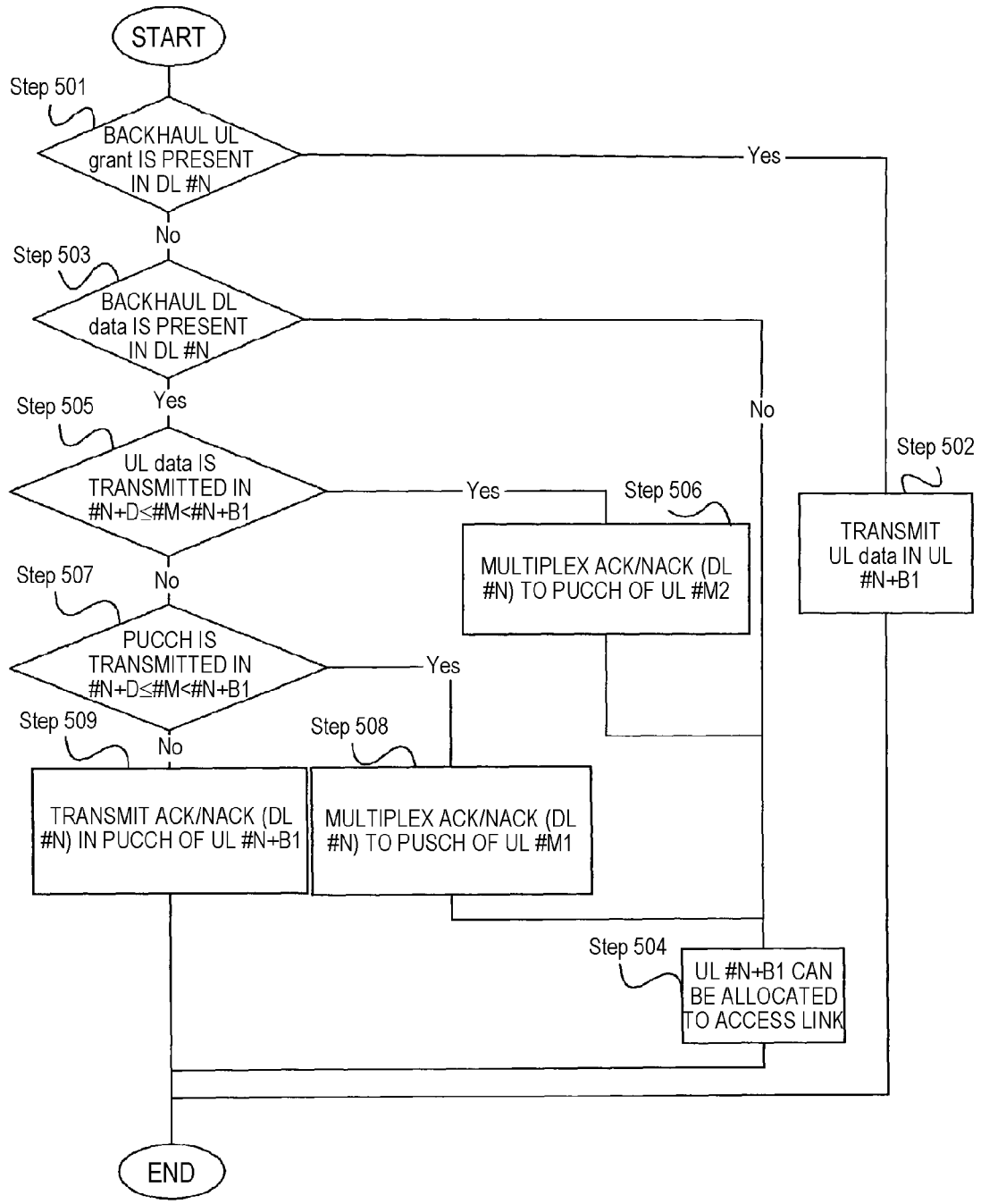
FIG. 5 is a flowchart illustrating a process of the relay station 100.
Figure 6:
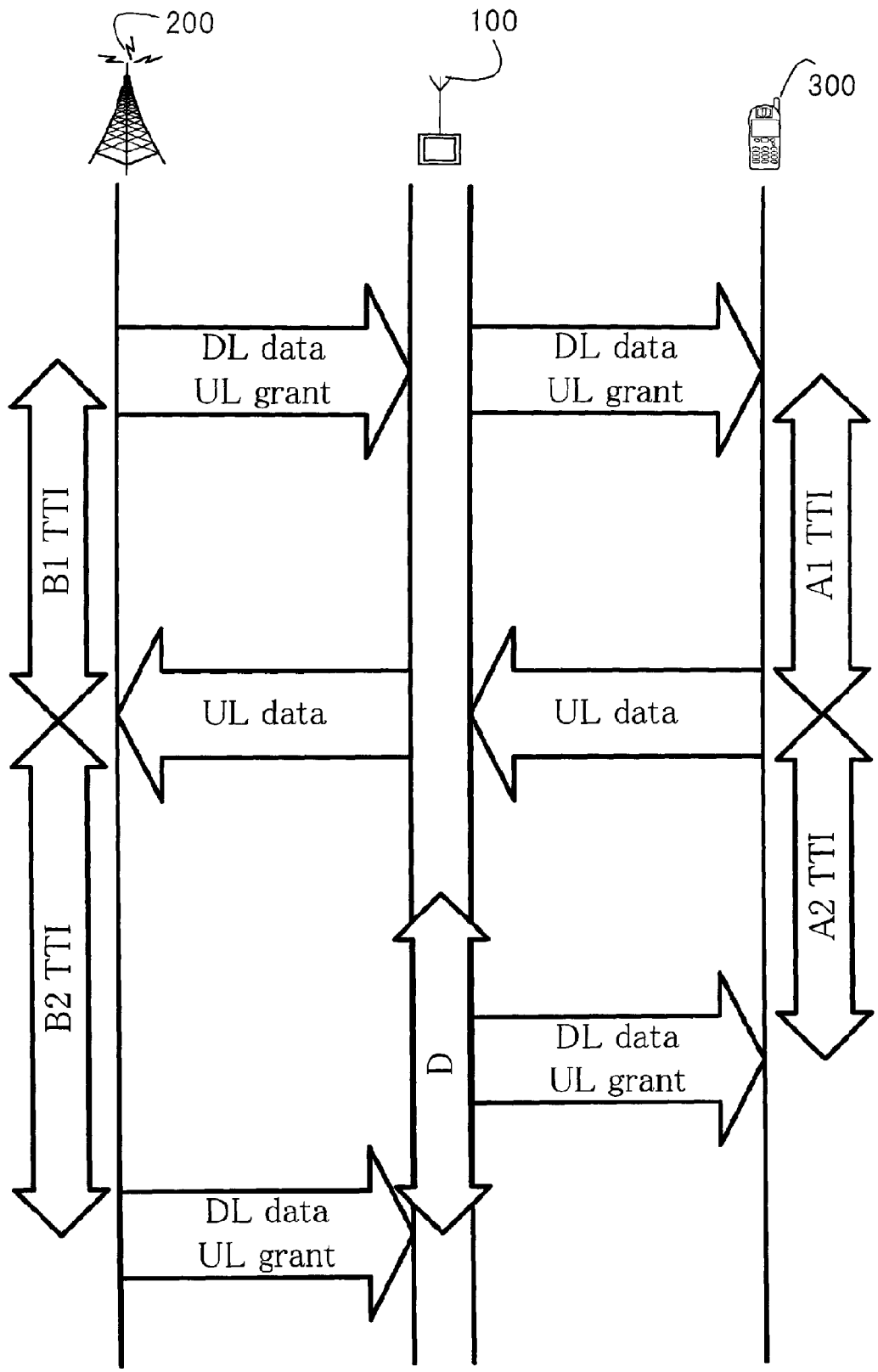
FIG. 6 is a diagram for describing the flowchart, in FIG. 5.

FIG. 5 is a flowchart illustrating a process of the relay station 100 according to this embodiment. The process of the relay station 100 will be described with reference to the flowchart, of FIG. 5. Further, in the flowchart of FIG. 5, the following variables are used for the description. These variables will be described with reference to one example of the flowchart of the TD relay shown in FIG. 6. In FIG. 6, the vertical axis direction represents a time domain. A variable B1 which is a natural number is sometimes varied when the variable B1 is recognized commonly by the base station 200 and the relay station 100. In FIG. 6, "1TTI" indicates "one subframe."

As shown in FIG. 6, "#N" denotes "candidate subframes of the DL backhaul." That is, subframe #N is one of the "candidate subframes of the DL backhaul." "#N+B1" denotes a "UL subframe which the UL grant transmitted in DL backhaul #N allocates." That is the subframe subsequent to subframe #N, which is a candidate subframe of the DL backhaul, by "B1" subframes is subframe "#N+B1." Further. "D" denotes a time interval at which process delay is necessary from the allocation of the DL data (in the drawing, marked as DL data) or the UL grant to the transmission of the UL data (in the drawing, marked as UL data) or ACK/NACK.

In Step 501, it is determined whether the UL grant of the backhaul UL is present in subframe #N (candidate subframe of DL backhaul) which is a DL subframe. In FIG. 5, subframe #N is marked as "DL#N." When the UL grant of the backhaul UL is present in subframe #N (Yes), the process proceeds to Step 502. Conversely when the UL grant of the backhaul UL is not present in subframe #N (No), the process proceeds to Step 503.

In Step 502, the UL data is transmitted in UL subframe "#N+B1" (in FIG. 5, marked as "UL #N+B1").

In Step 503, it is determined whether the backhaul. DL data is allocated to subframe #N which is the DL subframe. When it is determined that the backhaul DL data is not allocated to subframe #N, the process proceeds to Step 504. Conversely, when it is determined that the backhaul DL data is not allocated to subframe #N, the process proceeds to Step 505.

In Step 504, subframe "#N+B1" (in FIG. 5, marked as "UL #N+B1") which is the UL subframe can be allocated to the access link.

In Step 505, it is determined whether a subframe to which the backhaul UL data is allocated is present among subframes #M (in FIG. 5, marked as #M) from subframe "#N+D" (in FIG. 5, marked as "#N+D") to the subframe before subframe "#N+B1" (in FIG. 5, marked as "#N+B1"). When the subframe is allocated, the process proceeds to Step 506. Conversely when the subframe is not allocated, the process proceeds to Step 507. Further, subframe "#N+D" is a subframe subsequent to subframe #N by "D" subframes corresponding to the time interval necessary in the delay process to be described with reference to FIG. 6. Furthermore, subframe "#N+B1" is a subframe subsequent to subframe #N by "B1" subframes.

In Step 506, ACK/NACK (in FIG. 5, marked as ACK/NACK (DL #N)) for the DL data is multiplexed to subframe #M1 (in FIG. 5, marked as "UL #M1"), which is the subframe closest to subframe "#N+B1", among subframes #M to which the UL data is determined to be allocated in Step 505. Then, the process proceeds to Step 504.

In Step 507, it is determined whether ACK/NACK for the DL data is transmitted to the base station 200 in subframe #M (in FIG. 5, marked as #M) from subframe "#N+D" to the subframe before subframe "#N+B." Whether ACK/NACK is transmitted can be determined by determining whether "a subframe to which the DL data is allocated but the UL grant is not allocated" is present among the subframes from subframe "#N+D−B1" to subframe "#N−1". Since it has already been determined in Step 505 that the UL data is not present, it is determined in Step 507 whether the DL data is allocated to the subframes from subframe "#N+D−B1" to subframe "#N−1." When the DL data is allocated to the subframes from subframe "#N+D−B1" to subframe "#N−1", the process proceeds to Step 508. Conversely, when the DL data is not allocated to the subframes from subframe "#N+D−B1" to subframe "#N−1", the process proceeds to Step 509.

In Step 508, ACK/NACK for the DL data is multiplexed in subframe #M2 (in FIG. 5, marked as "UL #M2"), which is the subframe closest to subframe "#N+B1" among subframes #M to which ACK/NACK for the DL data is determined to be allocated in Step 507. Then, the process proceeds to Step 504.

In Step 509, ACK/NACK is transmitted in subframe "#N+B1" (in the drawing, marked as "UL #N+B1") which is a subframe of the UL.

When the plurality of corresponding subframes are present in step 506 or Step 508, the subframe closest to subframe "#N+B1" is selected. However, the subframe farthest from subframe "#N+B1" may be selected. When the subframe closest to subframe "#N+B1" is selected, an allowance appears in the processing time of the relay station 100. Further, when the subframe farthest from subframe "#N+B1" is selected, an allowance appears in the processing time of the base station 200. Thus, there is a small probability of a change occurring due to the allocation of the subsequent backhaul subframes.

Second Embodiment

In a second embodiment, even when an empty access link occurs due to the fact that no DL data of the backhaul is present and no UL allocation is present in a relay station 400, a problem in which allocation of the UL resource of an access link to the mobile station 600 connected to the relay station 400 is delayed and thus the UL resource of the access link is not efficiently utilized is resolved by causing the relay station 400 to transmit a "usability notification" to the mobile station 600.

The relay station 400 performs allocation to a subframe which may not be known to be allocated to the mobile station 600 and transmits the "usability notification" to the mobile station 600, when knowing that the allocation is possible in advance.

When the mobile station 000 receives the "usability notification" from the relay station 400, the mobile station 000 transmits a signal to the relay station 400. When the mobile station 600 does not receive the "usability notification" from the relay station 400, the mobile station 600 interrupts the transmission of the signal. Thus, since empty resources can be efficiently used, the usage efficiency of the resource is improved.

Figure 7:
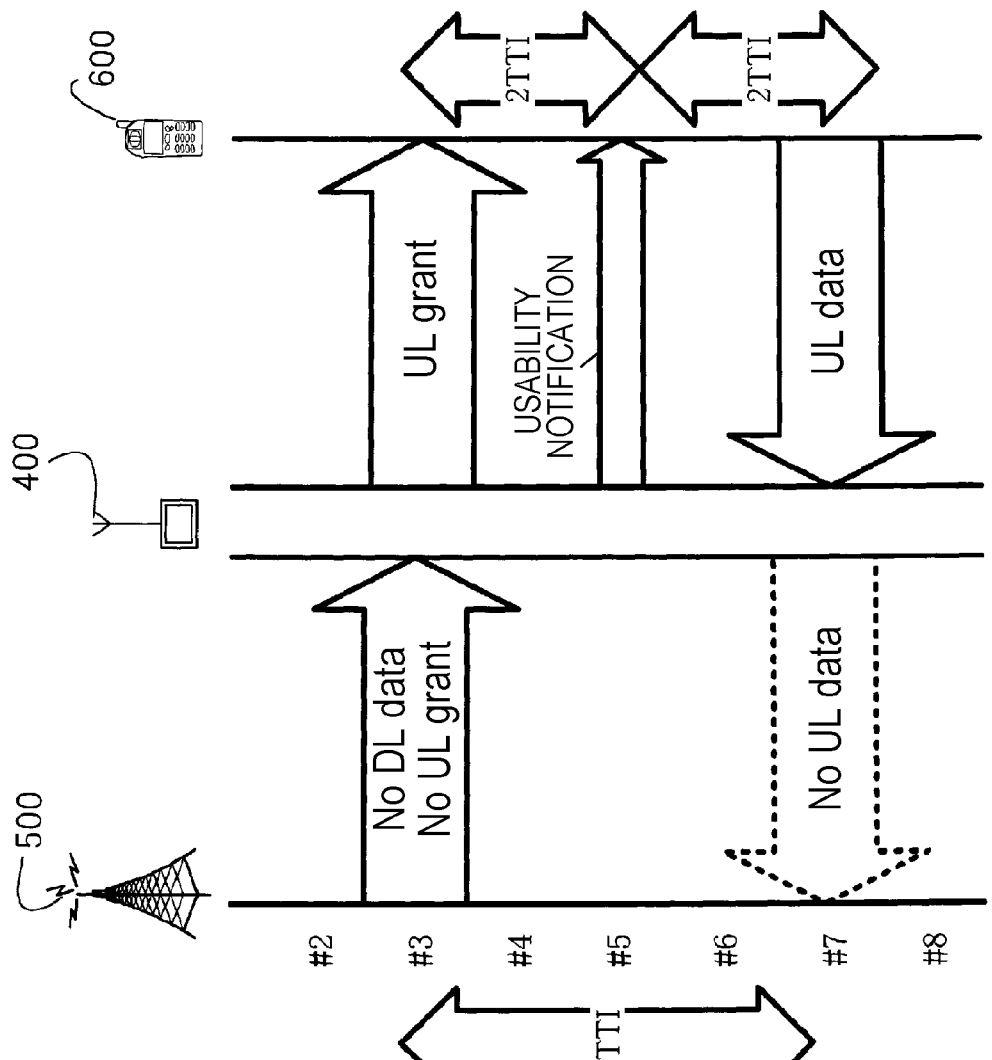
FIG. 7 illustrates an example (3) of the TD relay.

A process of the TD relay according to the second embodiment will be described with reference to FIGS. 7, 8, and 9. FIG. 7 illustrates an example (3) of the TD relay. In FIG. 7, the vertical axis direction represents a time domain and numbers #2 to #8 represent subframes. In FIG. 7, "1TTI" indicates "one subframe." In the example of FIG. 7, it is assumed that a UL is allocated after four subframes of a DL of both backhaul and access link.

In subframe #3 of the backhaul, the base station 500 connected to the relay station 400 does not transmit the DL data and UL (uplink) allocation information (UL grant) of subframe #7 to the relay station 400. Thus, in the same subframe #3, the relay station 400 allocates the UL in subframe #7 to the mobile station 600 in a state where the relay station 400 needs to transmit the UL data to the base station 500 in subframe #7.

Thereafter, since the relay station 400 does not receive the UL grant in subframe #3 of the backhaul, the relay station 400 can know that the relay station 400 does not need to transmit the UL data to the base station 500 in subframe #7. As a result, since the relay station 400 can know that the relay station 400 can use the access link in the same subframe #7, the relay station 400 can transmit the "usability notification", which is used to notify the mobile station 600 that the mobile station 000 can use the access link in subframe #7, to the mobile station G00 in subframe #5.

When the mobile station 000 receives the UL allocation information (UL grant) in the subframe #3 from the relay station 400, the mobile station 600 starts preparing transmission of the UL data to be transmitted in subframe #7. Thereafter, when the mobile station 600 receives the "usability notification" from the relay station 400 in subframe #5, the mobile station 600 transmits the UL data to the relay station 400 in subframe #7.

In the example of FIG. 7, the mobile station 600 transmits the UL data to the relay station 400. However, the mobile station 600 may not sometimes transmit the UL data. For example, (1) when the UL data is allocated in subframe #7 or (2) when the relay station 400 receives the DL data from the base station 500 in subframe #3 and needs to transmit ACK/NACK for the DL data in subframe #7, the relay station 400 does not transmit the "usability notification" to the mobile station 600. Thus, since the mobile station 600 does not receive the "usability notification" from the relay station 400, the mobile station 600 does not transmit the UL data to the relay station 400 in subframe #7.

Hereinafter, a case in which the mobile station 600 does not transmit the UL data to the relay station 400 will be described with reference to FIG. 8. FIG. 8 illustrates an example (4) of the TD relay. In FIG. 8, the vertical axis direction represents a time domain and numbers #2 to #8 represent subframes. In FIG. 8, "1TTI" indicates "one subframe." In the example of FIG. 8, it is assumed that a UL is allocated after four subframes of a DL of both backhaul and access link.

Figure 8:
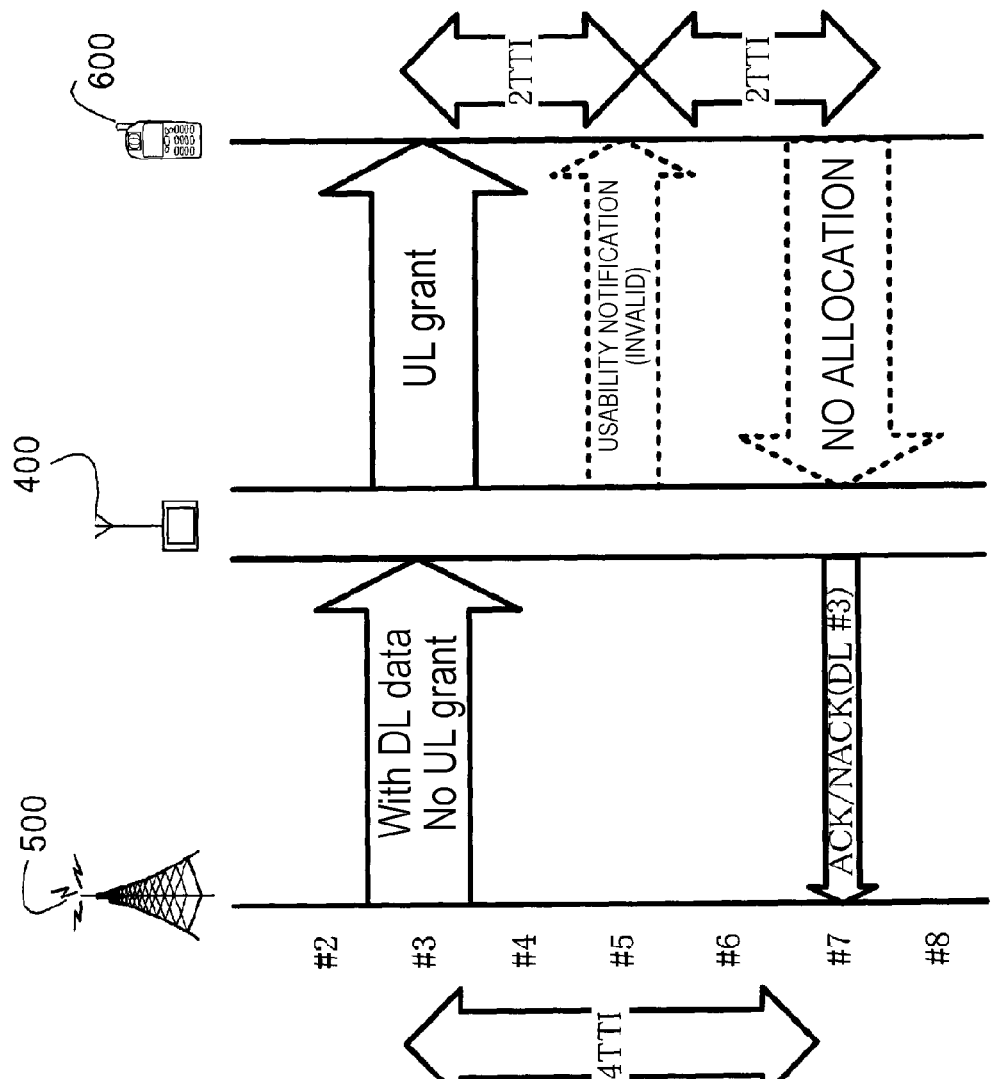
FIG. 8 illustrates an example (4) of the TD relay.

As shown in FIG. 8, when the relay station 400 receives DL data from the base station 500 in subframe #3, the relay station 400 needs to transmit ACK/NACK for the DL data to the base station 500 in subframe #7. Thus, the relay station 400 does not transmit "usability notification" to the mobile station 600. Accordingly, even when the relay station 400 transmits only ACK/NACK for the DL data in subframe #7, the relay station 400 has to interrupt the transmission of the UL data in subframe #7 of the access link. In the example of FIG. 8, the relay station 400 cannot use the entirety of subframe #7, even when the amount of signal of ACK/NACK transmitted by the base station 500 is the small number of bits. The fact that the entirety of subframe #7 cannot be used is not desirable in terms of the usage efficiency of the UL resource of the access link.

Accordingly, in the second embodiment, the relay station 400 multiplexes ACK/NACK for DL data scheduled to be transmitted to the UL data of another subframe or ACK/NACK for another DL data in a subframe to which no UL data of the backhaul is not allocated but the DL data is allocated, as in the first embodiment. However, "candidates of the backhaul subframe of the UL to which ACK/NACK for the DL data scheduled to be transmitted to the relay station 400" are different from those of the first embodiment.

The TD relay according to the second embodiment will be described with reference to FIG. 9. FIG. 9 illustrates an example of the TD relay according to the second embodiment. In FIG. 9, "1TTI" indicates "one subframe." In FIG. 9, a time associated with process delay in the relay station 400 is assumed to be four subframes ("4TTI"). In FIG. 9, a subframe to which the DL data is allocated but a UL grant is not allocated is assumed to be subframe #1. A subframe in which ACK/NACK for the DL data is scheduled to be transmitted is assumed to be subframe #5 subsequent to subframe #1 of the DL data by 4TTI (in the drawing, indicated by a broken line arrow).

Figure 9:
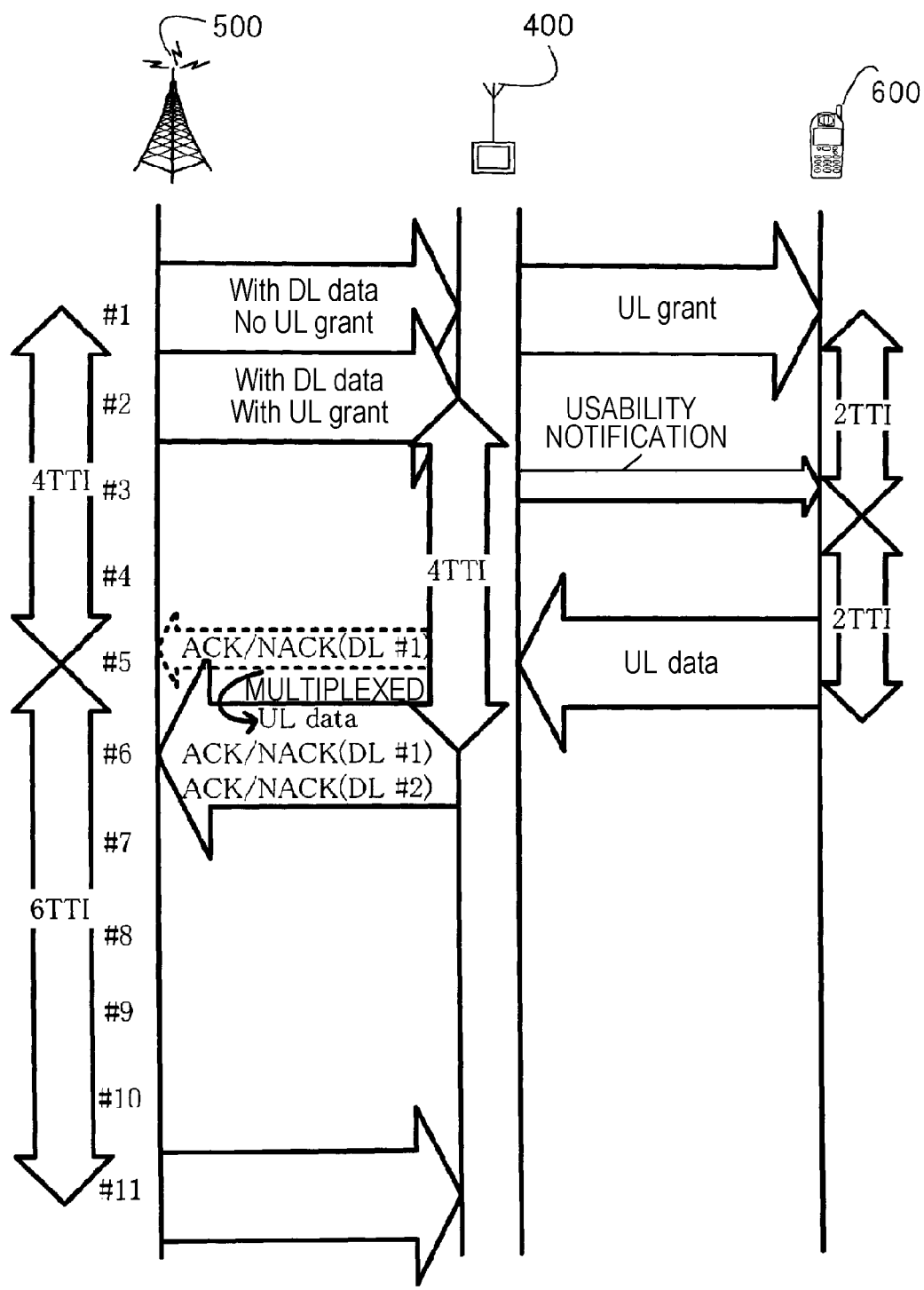
FIG. 9 illustrates an example of the TD relay according to a second embodiment.

In FIG. 9, RRT (Round tRip Time) in the DL of the subframe of the backhaul is assumed to be 10TTI. That is, in the backhaul, the base station 500 designates transmission of the UL data in the DL from a subframe (for example, in FIG. 9, subframe #2) and the relay station 400 transmits the UL data to the base station 500 after 4TTI (for example, in FIG. 9, subframe #6). Further, ACK/NACK is transmitted in the DL after 6TTI of the transmission of the UL data.

As shown in FIG. 9, subframe #6 which is a subframe subsequent to subframe #1 by five subframes and subframe #7 which is a subframe subsequent to subframe #1 by six subframes are the "candidates of the backhaul subframe of the UL to which ACK/NACK for the DL data scheduled to be transmitted to the relay station 400" (further, a method of determining the candidates of the backhaul subframe of the UL to which ACK/NACK is multiplexed will be described with reference to FIG. 11). When subframe #6 and subframe #7 are set as the "candidates of the backhaul subframe of the UL to which ACK/NACK for the DL data scheduled to be transmitted to the relay station 400", the DL data of subframe #1 can be retransmitted in time even if retransmission must be done in the subframe #1 and the process delay of the relation station 400 occurs by 4TTI.

In the example of FIG. 9, since the UL data is transmitted in the subframe #6 of the backhaul, the relay station 400 multiplexes ACK/NACK for the DL data to the UL data in subframe #6 and transmits the multiplexed result to the base station 500.

As described above, the relay station 400 according to this embodiment multiplexes ACK/NACK for the DL data to the UL data in a subframe of another UL. Therefore, a subframe in which the relay station 400 cannot transmit a signal to the base station 500 can be set in the subframes of the backhaul UL. Accordingly, in this embodiment, it is possible to increase the number of subframes of the UL of the access link which the relay station 400 can receive from the mobile station 600 connected to the relay station 400.

The relay station 400 according to this embodiment has the advantage of reducing the number of times the transmission and reception are switched therebetween. In the example of FIG. 9, the relay station 400 does not have to switch between the transmission and reception in subframe #5. When the transmission and reception are switched therebetween, a switching period is necessary and symbols of the reception or transmission of the relay station 400 have to be sacrificed in the switching period. Accordingly, the relay station 400 can reduce the number of symbols which may not be used for the transmission and reception, when the number of times the transmission and reception are switched therebetween is reduced.

Figure 10:
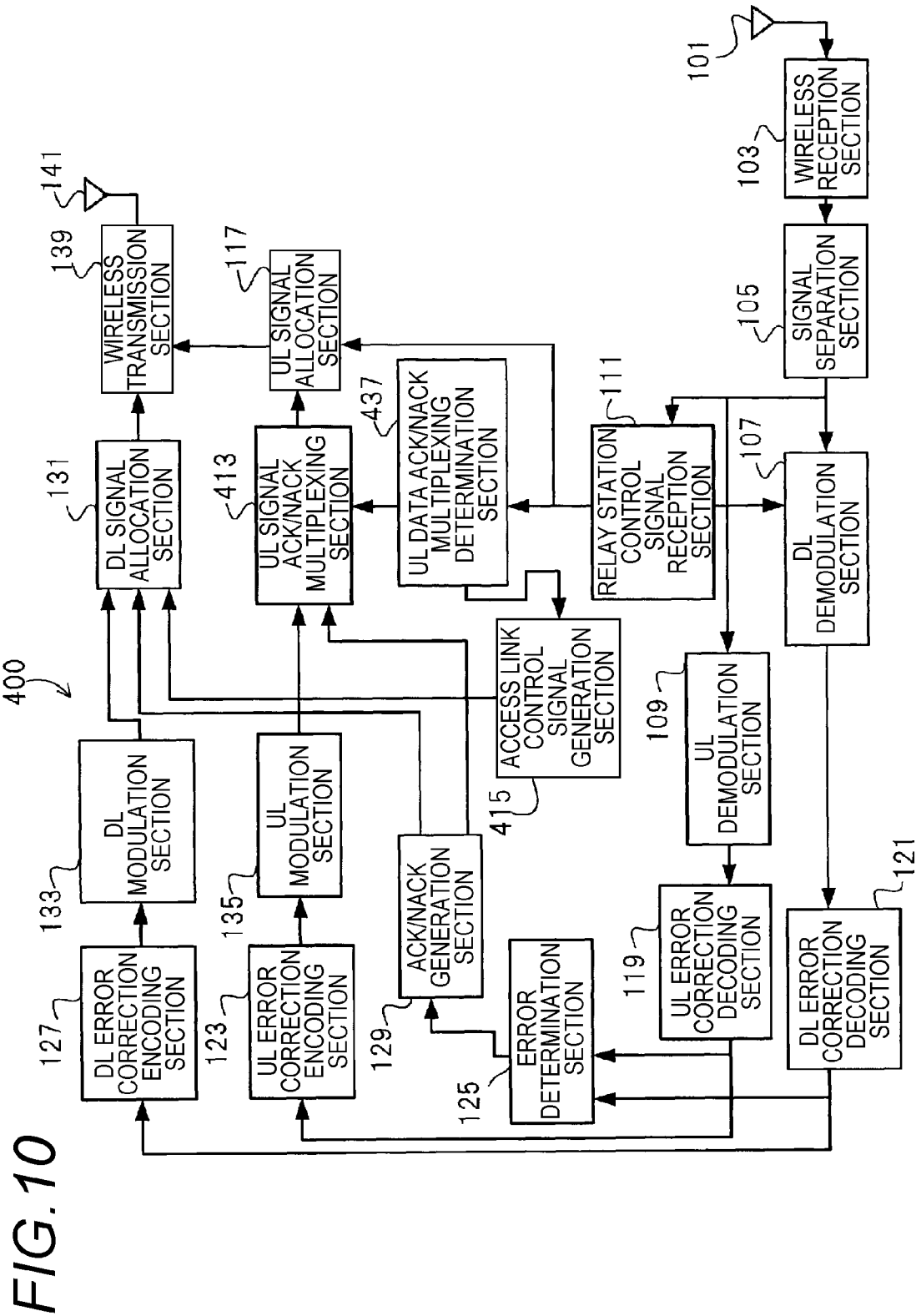
FIG. 10 is a block diagram illustrating the configuration of a relay station 400 according to the second embodiment.

The configuration of the relay station 400 according to this embodiment will be described with reference to FIG. 10. FIG. 10 is a block diagram illustrating the configuration of the relay station 400 according to this embodiment. The relay station 400 shown in FIG. 10 includes a reception antenna 101, a wireless reception section 103, a signal separation section 105, a DL demodulation section 107, a UL demodulation section 109, a relay station control signal reception section 111, a UL data ACK/NACK multiplexing section 413, an access link control signal generation section 415, a UL signal allocation section 117, a UL error correction decoding section 119, a DL error correction decoding section 121, a UL error correction encoding section 123, an error determination section 125, a DL error correction encoding section 127, an ACK/NACK generation section 129, a DL signal allocation section 131, a DL modulation section 133, a UL modulation section 135, a UL data ACK/NACK multiplexing determination section 437, a wireless transmission section 139, and a transmission antenna 141.

The relay station 400 shown in FIG. 10 has a configuration different from the relay station 100 shown in FIG. 4 in that the relay station 400 includes the UL data ACK/NACK multiplexing determination section 437, the UL data ACK/NACK multiplexing section 413, and the access link control signal generation section 415 instead of the UL data ACK/NACK multiplexing determination section 137, the UL data ACK/NACK multiplexing section 113, and the access link control signal generation section 115. Since the other configuration is the same, the same reference numerals are given.

The wireless reception section 103 receives a signal from the base station 200 through the reception antenna 101. The wireless reception section 103 performs wireless processing such as down-conversion on the received signal and outputs the processed signal to the signal separation section 105.

The signal separation section 105 separates the signal input from the wireless reception section 103 into a DL signal and a UL signal, and control signals. The separated DL signal is output to the DL demodulation section 107. The separated UL signal is output to the DL demodulation section 109. The separated control signals are output to the relay station control signal reception section 111.

The relay station control signal reception section 111 demodulates and decodes a relay station control signal transmitted from the base station 200 among the control signals separated by the signal separation section 105. Further, a DL control signal and a UL control signal separated among the control signals by the signal separation section 105 are output to the UL data ACK/NACK multiplexing determination section 137. The UL control signal is also output to the UL signal allocation section 117.

The UL demodulation section 109 demodulates the UL signal input from the wireless reception section 103 and outputs the demodulated DL signal to the UL error correction decoding section 119.

The DL demodulation section 107 demodulates the DL signal input from the wireless reception section and outputs the demodulated DL signal to the DL error correction decoding section 121.

The UL error correction decoding section 119 decodes the signal input from the DL demodulation section 109 and outputs the decoded signal to the UL error correction encoding section 123 and the error determination section 125.

The DL error correction decoding section 121 decodes the signal input from the DL demodulation section 107 and outputs the decoded signal to the DL error correction encoding section 127 and the error determination section 125.

The error determination section 125 determines whether an error occurs in the input signal and outputs the determination result to the ACK/NACK generation section 129.

The ACK/NACK generation section 129 generates NACK when it is determined that an error occurs. The ACK/NACK generation section 129 generates ACK when it is determined that no error occurs. The ACK/NACK generation section 129 outputs the determination result of the DL signal to the DL signal allocation section 131. The ACK/NACK generation section. 129 outputs the determination result of the UL signal to the UL data ACK/NACK multiplexing section 413.

The decoded DL signal output from the DL error correction decoding section 121 is processed by the DL error correction encoding section 127 and the DL modulation section 133, and then the processed signal is output to the DL signal allocation section 131.

The decoded UL signal output from the UL error correction decoding section 119 is processed by the UL error correction encoding section 123 and the UL modulation section 135, and then the processed signal is output to the UL data ACK/NACK multiplexing section 413.

Based on the UL control signal and the DL control signal, the UL data ACK/NACK multiplexing determination section 437 determines whether the UL signal and ACK/NACK are transmitted with the same subframe. When the UL data ACK/NACK multiplexing determination section 437 determines that the UL signal and the ACK/NACK signal are transmitted in the same subframe, the UL data ACK/NACK multiplexing determination section 437 determines that the ACK/NACK signal is multiplexed to the UL signal. Conversely, when UL data ACK/NACK multiplexing determination section 437 determines that the UL signal and the ACK/NACK signal are transmitted in different subframes, the UL data ACK/NACK multiplexing determination section 437 determines that the ACK/NACK signal is not multiplexed to the UL signal.

Determination method (1) to (3) of the UL data ACK/NACK multiplexing determination section 437 will be described. Whether the UL data and ACK/NACK are transmitted in the same subframe is determined based on the UL control signal and the DL control signal.

(1) When the UL data is allocated to subframe "#N+B1" subsequent to subframe #N in which the DL subframe is allocated by "B1" subframes, it is determined that ACK/NACK for the DL data is multiplexed to the UL data.

(2) When the UL data is not allocated to subframe "#N+B1" and the UL data is allocated to subframe from subframe "#N+B1+1" to subframe "#N+B1+B2−D", ACK/NACK scheduled to be transmitted in subframe "#N+B1" is multiplexed to the subframe to which the UL data is allocated. Here, the subframe to which a signal in which ACK/NACK is multiplexed to the UL data is allocated is one of the subframes from subframe "#N+B1+1" to subframe "#N+B1+B2−D."

(3) When the UL data is not allocated to, but ACK/NACK for the DL data is transmitted in the subframe from subframe"#N+B1+1" to subframe "#N+B1+B2−D", ACK/NACK scheduled to be transmitted in subframe "#N+B1" is multiplexed to a subframe in which ACK/NACK is scheduled to be transmitted. Here, the subframe in which ACK/NACK is scheduled to be transmitted is one of the backhaul subframes of the UL from subframe "#N+B1+1" to subframe "#N+B1+B2−D." Further, the determination result of the UL data ACK/NACK multiplexing determination section 437 is output to the UL data ACK/NACK multiplexing section 413 and the access link control signal generation section 115.

The UL data ACK/NACK multiplexing section 413 multiplexes the ACK/NACK signal to the UL data and outputs the multiplexed UL signal to the UL signal allocation section 117, when the UL data and ACK/NACK are transmitted in the same subframe based on the determination result input from the UL data ACK/NACK multiplexing determination section 437. Further, the UL data ACK/NACK multiplexing section 413 does not multiplex ACK/NACK signal when the ACK/NACK signal is transmitted in a subframe different, from the subframe in which the UL data is transmitted based on the determination result input, from the UL data ACK/NACK multiplexing determination section 437.

The UL signal allocation section 117 allocates the UL data in the UL signal to a resource designated by the UL control signal. Further, the UL signal allocation section 117 allocates the ACK/NACK signal not multiplexed to the UL data in the UL signal to a resource of the UL control signal and outputs the ACK/NACK signal to the wireless transmission section 139.

The access link control signal generation section 415 adds a subframe usable in the access link based on the determination result of the UL data ACK/NACK multiplexing determination section 437. Further, access link control signal generation section 415 generates a control signal for the mobile station 600 which includes "usability notification" indicating the information regarding the subframe usable in the access link and outputs the generated control signal to the DL signal allocation section 131.

[Usability Notification Signal]

Here, a "usability notification signal" transmitted from the relay station 400 to the mobile station (100 is sent in a PDCCH resource (where 1CCE is 36RE). The usability notification signal is assigned in a common search space in the PDCCH resource so as to be received simultaneously by a plurality of mobile stations. Further, a common search space may be newly provided for a mobile station connected to the relay station 400. When the common search space is used, the usability notification can be transmitted immediately before (before one subframe) since the number of times blind decoding is performed is reduced.

Further, the "usability notification signal" transmitted from the relay station 400 to the mobile station 600 may be transmitted using a PHICH resource (where 1PHICH group is formed by 12RE and eight ACK/NACKs can be multiplexed). In this case, when scheduling is empty in the PHICH group, one PHICH group can be used.

The DL signal allocation section 131 allocates the DL signal, the ACK/NACK signal, and the control signal for the mobile station 600 to the resource of the access link and outputs the DL signal, the ACK/NACK signal, and the control signal for the mobile station 600 to the wireless transmission section 139.

The wireless transmission section 139 performs wireless processing such as up-conversion on the DL signal, the ACK/NACK signal, and the control signal for the mobile station 600 output from the DL signal allocation section 131 and transmits the processed results to the mobile station 600 through the transmission antenna 141.

Figure 11:
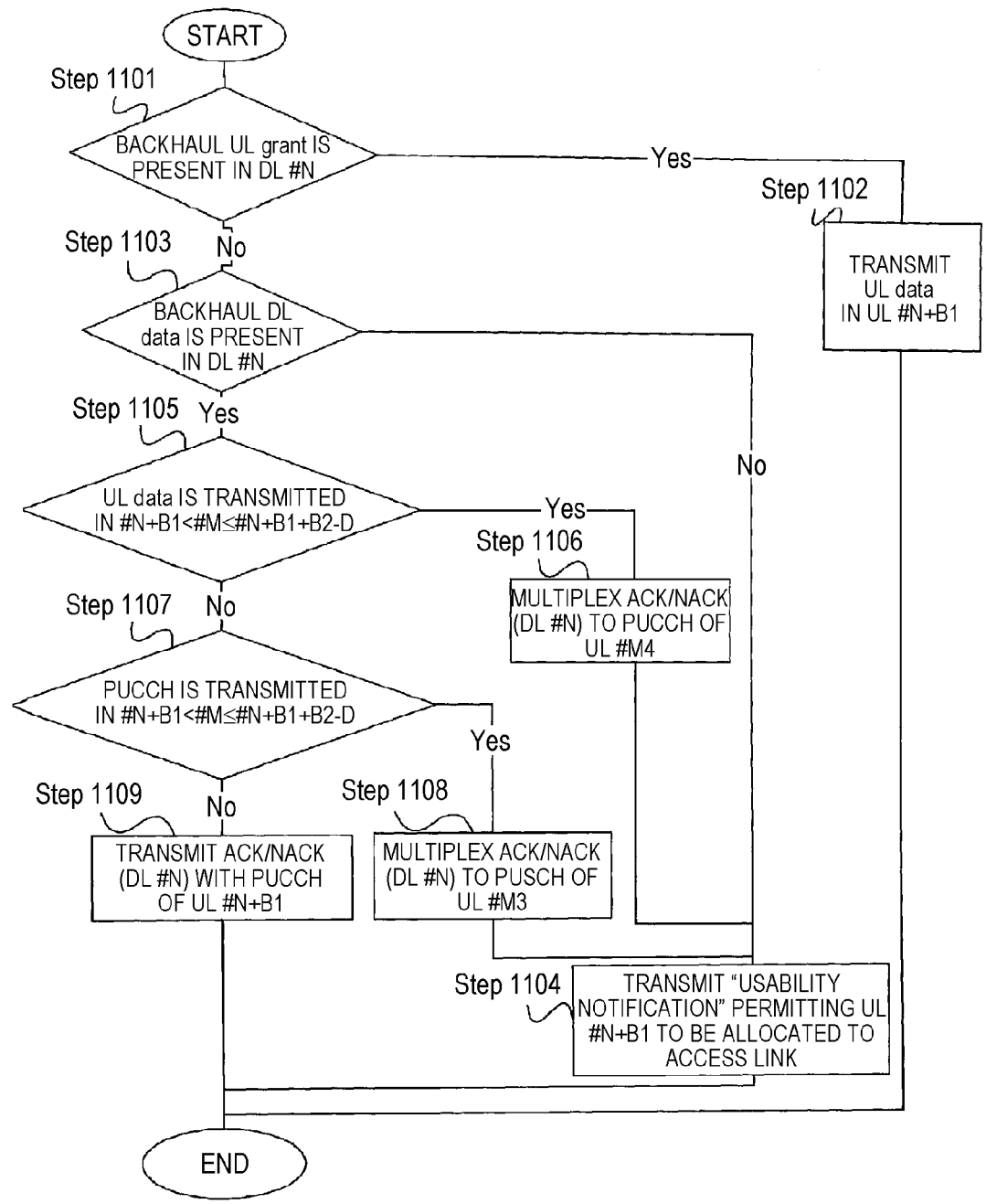
FIG. 11 is a flowchart illustrating a process of the relay station 400.
Figure 12:
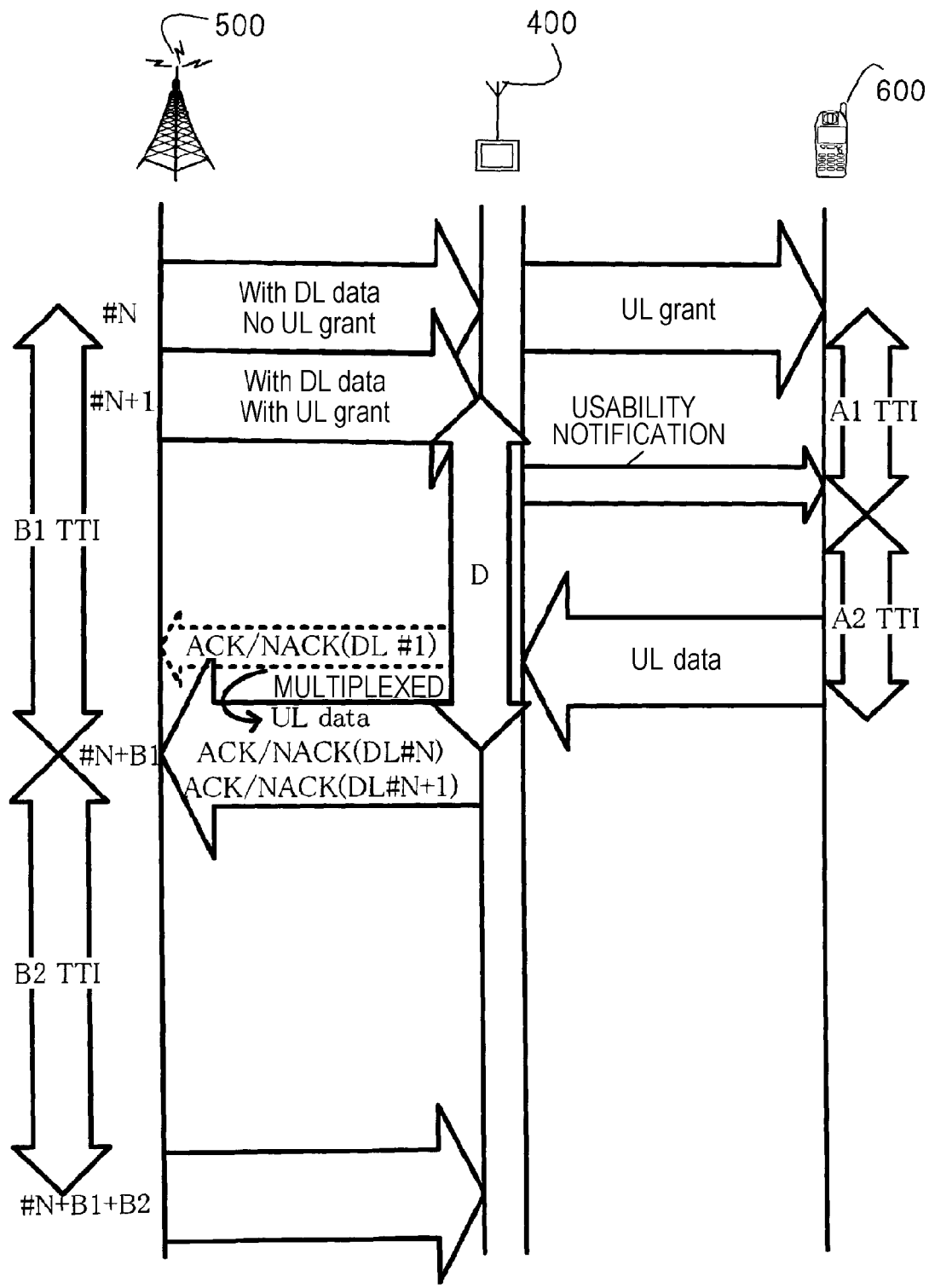
FIG. 12 is a diagram for describing the flowchart in FIG. 11.
Figure 13:
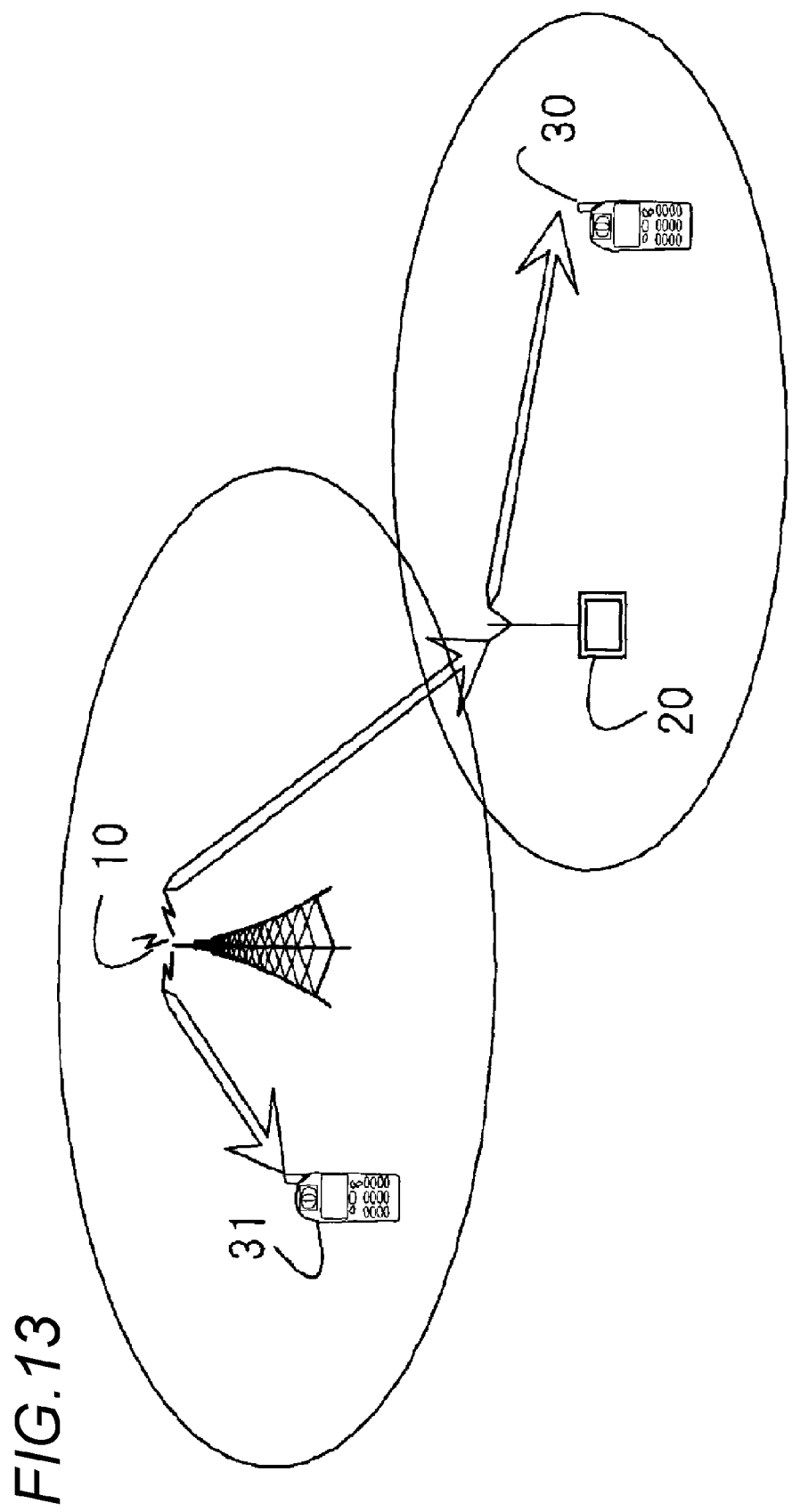
FIG. 13 illustrates the overall configuration of a wireless relay system.

FIG. 11 is a flowchart, illustrating a process of the relay station 400 according to this embodiment. The process of the relay station 400 will be described with reference to the flowchart of FIG. 11. Further, in the flowchart of FIG. 11, the following variables are used for the description. These variables will be described with reference to one example of the flowchart of the TD relay shown in FIG. 12. In FIG. 12, the vertical axis direction represents a time domain. In FIG. 12, "1TTI" indicates "one subframe."

As shown in FIG. 12, "#N" denotes "candidate subframes of the DL backhaul." That is, subframe #N is one of the "candidate subframes of the DL backhaul." "#N+B1." denotes a "UL subframe which the UL grant transmitted in subframe #N of DL backhaul allocates." That is, the subframe subsequent to subframe #N, which is a candidate subframe of the DL backhaul, by "B1" subframes is subframe "#N+B1." However, a variable B1 is sometimes varied when the variable B1 is recognized commonly by the base station 500 and the relay station 400. "N+B1+B2" is a subframe subsequent to subframe "#N+B1" by "B2" subframes and is a backhaul DL subframe in which ACK/NACK for the UL data transmitted in subframe "#N+B1" is transmitted. Further. "D" denotes a time interval at which process delay is necessary from the allocation of the DL data or the UL grant to the transmission of the UL data or ACK/NACK.

In Step 1101, it is determined whether the UL grant of the backhaul UL is present in subframe #N (candidate subframe of DL backhaul) which is a DL subframe. In FIG. 11, subframe #N is marked as "DL #N." When the UL grant of the backhaul UL is present in subframe #N (Yes), the process proceeds to Step 1102. Conversely, when the UL grant of the backhaul. UL is not present in subframe #N (No), the process proceeds to Step 1103.

In Step 1102, the UL data is transmitted in subframe "#N+B1" (in FIG. 11, marked as "UL#N+B1") which is a UL subframe.

In Step 1103, it is determined whether the backhaul DL data is allocated to subframe #N which is the DL subframe. When it is determined that the backhaul DL data is not allocated to subframe #N, the process proceeds to Step 1104. Conversely, when it is determined that the backhaul DL data is allocated to subframe #N, the process proceeds to Step 1105.

In Step 1104, the "usability notification" by which subframe "#N+B1" (in the same step, marked as "UL #N+B1") which is the UL subframe can be allocated to the access link is transmitted to the mobile station 600.

In Step 1105, it is determined whether the UL data of the backhaul is allocated in subframes #M (in FIG. 11, marked as "#M") from subframes subsequent: to subframe "#N+B1" by one subframe to subframe "#N+B1+B2−D" (in FIG. 11, marked as "#N+B1+B2−D"). When the subframe is allocated, the process proceeds to Step 1106. Conversely; when the subframe is not allocated, the process proceeds to Step 1107. Further, subframe "#N+B1+B2−D" is a subframe subsequent to subframe "#N+B1+B2" by "D" subframes corresponding to the time interval necessary in the delay process to be described with reference to FIG. 11.

In Step 1106, ACK/NACK (in FIG. 11, marked as ACK/NACK #N)) for the DL data is multiplexed to subframe #M3 (in FIG. 11, marked as "UL #M3"), which is the subframe closest to subframe "#N+B1", among subframes #M to which the UL data is determined to be allocated in Step 1105. Then, the process proceeds to Step 1104.

In Step 1107, it is determined whether ACK/NACK for the DL data is transmitted in the subframe of the backhaul of the UL in subframes #M (in FIG. 11, marked as #M) from the subframe subsequent to subframe "#N+B1" by one subframe to subframe "#N+B1+B2−D." Whether ACK/NACK for the DL data is transmitted to the base station 500 can be determined by determining whether "a subframe to which the DL data is allocated but the UL grant is not allocated" is present among the subframes from subframe "#N+B1+1" to subframe "#N+B1+B2−D". Since it has already been determined in Step 1105 that the UL data is not present, it is determined in Step 1107 whether the DL data is allocated to the subframes from subframe "#N+B1+1" to subframe "#N+B1+B2−D." When the DL data is allocated to the subframes from subframe "#N+B1+1" to subframe "#N+B1+B2−D" the process proceeds to Step 1108. Conversely, when the DL data is not allocated to the subframes from subframe "#N+B1+1" to subframe "#N+B1+B2−D", the process proceeds to Step 1109.

In Step 1108, ACK/NACK for the DL data is multiplexed in subframe #M4, which is the subframe closest to subframe "#N+B1" among subframes #M to which ACK/NACK for the DL data is determined to be allocated in Step 1107. Then, the process proceeds to Step 1104.

In Step 1109, ACK/NACK for the DL data is transmitted in subframe "#N+B1" which is a UL subframe.

In the above-described embodiments, the backhaul subframes may be allocated to continuous subframes in advance. When the continuous subframes are allocated to the backhaul and the UL data is transmitted in an adjacent subframe, ACK/NACK scheduled to be transmitted in a subframe in which the UL data is not transmitted can be multiplexed.

Each functional block described in the above-described embodiments is generally realized by an LSI which is an integrated circuit. The functional blocks may be separately integrated as one chip, or some or all of the functional blocks may be integrated as one chip. Here, the functional blocks are integrated as an LSI. However, the LSI may be called an IC, a system LSI, a super LSI, or an ultra LSI.

The method of forming the functional blocks as an integrated circuit is not limited to the LSI, but may be realized by a dedicated circuit or a general processor. After the LSI is manufactured, a programmable FPGA (Field Programmable Gate Array) or a reconfigurable processor capable of reorganizing the connection or setting of circuit cells in the LSI may be used.

When techniques for an integrated circuit substituting the LSI are developed with advance in semiconductor techniques or derived separate techniques, the functional blocks may, of course, be integrated using the developed techniques. Biotechniques may be applied.

In the above-described embodiments, the antenna has been used, but an antenna port may be applied similarly. The antenna port refers to a logical antenna configured by one physical antenna or a plurality of physical antennas. That is, the antenna port is not limited to the antenna port configured by one physical antenna, but may refer to an array antenna or the like configured by a plurality of antennas. For example, in LTE, it is not regulated how many physical antennas are used to configure an antenna port. The antenna port is regulated as the minimum unit in which a base station can transmit different reference signals. Further, the antenna port is sometimes regulated as the minimum unit used to multiply a weight of a Precoding vector.

The detailed and specific embodiments of the invention has been described, but it is apparent to those skilled in the art that the invention is modified or corrected without departing from the spirit and scope of the invention.

The present application is based on the benefit of Japanese Patent Application (Japanese Patent Application No. 2010-083010) filed on Mar. 31, 2010, the contents of which is hereby incorporated by reference.

INDUSTRIAL APPLICABILITY

According to the wireless communication device and the wireless communication method of the invention, it is possible to obtain the advantages of improving the usage efficiency of resources and reducing the number of times transmission and reception are switched therebetween, and the wireless communication device and the wireless communication method are useful as a wireless communication relay station apparatus or the like.

REFERENCE SIGNS LIST 100, 400: RELAY STATION
200, 500: BASE STATION
300, 600: MOBILE STATION
137, 437: UL DATA ACK/NACK MULTIPLEXING DETERMINATION SECTION
113, 413: UL SIGNAL ACK/NACK MULTIPLEXING SECTION
115, 415: ACCESS LINK CONTROL SIGNAL GENERATION SECTION

The invention claimed is:

1. A wireless communication device, comprising:
a reception section that is configured to receive a downlink signal in a first subframe from another wireless communication device;
an ACK/NACK generation section that is configured to generate ACK/NACK which indicates an error determination result of the received downlink signal;
a determination section that is configured, when an uplink signal directed to the wireless communication device is not allocated in a second subframe, to determine whether a different uplink signal is allocated in one or more third subframes, wherein the one or more third subframes are subframes subsequent to the first subframe by a determined number of subframes and previous to the second subframe;
a multiplexing section that is configured to multiplex the ACK/NACK to the different uplink signal in the one or more third subframes when the determination section determines that the different uplink signal is allocated in the one or more third subframes; and
a transmission section that is configured to transmit the different uplink signal in which the ACK/NACK is multiplexed by the multiplexing section.

2. The wireless communication device according to claim 1, wherein
the determination section determines whether the different uplink signal is allocated in a subframe which is closest to the first subframe among the one or more third subframes.

3. The wireless communication device according to claim 1, wherein
the determined number of subframes corresponds to a process delay time in the wireless communication device.

4. A wireless communication device, comprising:
a reception section that is configured to receive a downlink signal in a first subframe from a first other wireless communication device;
an ACK/NACK generation section that is configured to generate first ACK/NACK which indicates an error determination result of the received downlink signal;
a determination section that is configured, when an uplink signal directed to the first other wireless communication device is not allocated in a second subframe, to determine whether a different uplink signal or second ACK/NACK for a different downlink signal is allocated in one or more fourth subframes, wherein said one or more fourth subframes are subframes subsequent to the second subframe by a determined number of subframes and previous to a third subframe subsequent to the second subframe;
a multiplexing section that is configured to multiplex the first ACK/NACK to the different uplink signal or the second ACK/NACK for the different downlink signal in the one or more fourth subframes when the determination section determines that the different uplink signal or the second ACK/NACK for the different downlink signal is allocated in the one or more fourth subframes; and
a transmission section that is configured to transmit the different uplink signal or the second ACK/NACK for the different downlink signal in which the first ACK/NACK is multiplexed by the multiplexing section.

5. The wireless communication device according to claim 4, further comprising:
a control signal generation section that is configured to generate a control signal used to notify a second other wireless communication device of information on a subframe that is usable in an access link based on a determination result of the determination section.

6. The wireless communication device according to claim 4, wherein
the determined number of subframes corresponds to a difference between a process delay time in the wireless communication device and a time from the second subframe to a fifth subframe in which ACK/NACK responsive for the uplink signal transmitted in the second subframe is transmitted.

7. A wireless communication method, comprising:
receiving a downlink signal in a first subframe from a first other wireless communication device;
generating an ACK/NACK which indicates an error determination result of the received downlink signal;
when an uplink signal directed to the first other wireless communication device is not allocated in a second subframe, determining whether a different uplink signal is allocated in a third subframe, wherein the third subframe is a subframe subsequent to the first subframe by a determined number of subframes and previous to the second subframe;
multiplexing the ACK/NACK to the different uplink signal in the third subframe when it is determined that the different uplink signal is allocated in the third subframe; and
transmitting the different uplink signal in which the ACK/NACK is multiplexed.

8. A wireless communication method, comprising:
receiving a downlink signal in a first subframe from a first other wireless communication device;
generating first ACK/NACK which indicates an error determination result of the received downlink signal;
when an uplink signal directed to the first other wireless communication device is not allocated in a second subframe, determining whether a different uplink signal or second ACK/NACK for a different downlink signal is allocated in a fourth subframe, wherein said forth subframe is a subframe subsequent to the second subframe by a determined number of subframes and previous to a third subframe subsequent to the second subframe;
multiplexing the first ACK/NACK to the different uplink signal or the second ACK/NACK for the different downlink signal in the fourth subframe, when determining that the different uplink signal or the second ACK/NACK for the different downlink signal is allocated in the fourth subframe; and
transmitting the different uplink signal in which the first ACK/NACK is multiplexed or the second ACK/NACK for the different downlink signal.

* * * * *